United States Patent
Tsuboi et al.

(10) Patent No.: US 12,120,532 B2
(45) Date of Patent: Oct. 15, 2024

(54) STATION PLACEMENT DESIGNING METHOD AND STATION PLACEMENT DESIGNING APPARATUS

(71) Applicant: NIPPON TELEGRAPH AND TELEPHONE CORPORATION, Tokyo (JP)

(72) Inventors: Hideyuki Tsuboi, Musashino (JP); Hideki Toshinaga, Musashino (JP); Kazuto Goto, Musashino (JP); Shuki Wai, Musashino (JP); Yushi Shirato, Musashino (JP); Naoki Kita, Musashino (JP); Takeshi Onizawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 374 days.

(21) Appl. No.: 17/768,412

(22) PCT Filed: Oct. 18, 2019

(86) PCT No.: PCT/JP2019/041170
§ 371 (c)(1),
(2) Date: Apr. 12, 2022

(87) PCT Pub. No.: WO2021/075058
PCT Pub. Date: Apr. 22, 2021

(65) Prior Publication Data
US 2022/0295293 A1    Sep. 15, 2022

(51) Int. Cl.
H04W 16/18    (2009.01)
G06T 7/70    (2017.01)

(52) U.S. Cl.
CPC .............. *H04W 16/18* (2013.01); *G06T 7/70* (2017.01)

(58) Field of Classification Search
CPC ................................. G06T 7/70; H04W 16/18
See application file for complete search history.

(56) References Cited

U.S. PATENT DOCUMENTS

2006/0003774 A1* 1/2006 Byun .................... H04W 16/18
455/452.1
2012/0015684 A1* 1/2012 Noji ..................... H04B 7/0617
342/368

FOREIGN PATENT DOCUMENTS

JP    4295746 B2    7/2009

OTHER PUBLICATIONS

Sean Kinney, Telecom Infra Project focuses on millimeter wave for dense networks, Image courtesy of the Telecom Infra Project, RCR Wireless News, Intelligence on all things wireless, Sep. 13, 2017, https://www.rcrwireless.com/20170913/carriers/telecom-infra-project-millimeter-wave-tag17.

(Continued)

*Primary Examiner* — Timothy X Pham
(74) *Attorney, Agent, or Firm* — Harness, Dickey & Pierce, P.L.C.

(57) ABSTRACT

On two-dimensional map data indicating buildings serving as candidates for installing terminal station devices, locations of base station installation structures serving as candidates for installing base station devices are set as base station candidate locations, and for each of the base station candidate locations, buildings that have other buildings between themselves and the base station candidate location are selected as visibility detection subject buildings. The heights of the buildings are set at an identical length, a higher position than the buildings is set as an installation altitude of the base station devices, and for each selected visibility detection subject building, a visibility range of the visibility detection subject building from the installation altitude of the base station device in the base station candi- (Continued)

date location is detected. Three-dimensional point cloud data acquired by photographing a region including the base station installation structures and the buildings are narrowed down on the basis of the detected visibility ranges, and using the narrowed-down point cloud data, the visibility of the buildings from the base station candidate locations is determined.

8 Claims, 35 Drawing Sheets

(56) References Cited

OTHER PUBLICATIONS

Frederic Lardinois, Facebook-backed Telecom Infra Project adds a new focus on millimeter wave tech for 5G, TechCrunch, Sep. 13, 2017, https://techcrunch.com/2017/09/12/facebook-backed-telecom-infra-project-adds-a-new-focus-on-millimeter-wave-tech-for-5g/?renderMode=ie11.

Jamie Davies, DT and Facebook TIP the scales for mmWave, telecoms.com, Sep. 12, 2017, http://telecoms.com/484622/dt-and-facebook-tip-the-scales-for-mmwave/.

\* cited by examiner

STATION PLACEMENT DESIGNING METHOD AND STATION PLACEMENT DESIGNING APPARATUS

CROSS-REFERENCE TO RELATED APPLICATIONS

This application is a 371 U.S. National Phase of International Application No. PCT/JP2019/041170, filed on Oct. 18, 2019. The entire disclosure of the above application is incorporated herein by reference.

TECHNICAL FIELD

The present invention relates to a station installation support method and a station installation support device.

BACKGROUND ART

FIG. 35 is a view extracted from NPL1 to NPL3, showing an outline of millimeter wave wireless communication performed between a base station device (referred to hereafter as a "base station") installed on a utility pole and a terminal station device (referred to hereafter as a "terminal station") installed on a building such as a residence. FIG. 35 shows a use case proposed by mmWave Networks in the TIP (Telecom Infra Project), which is a consortium that promotes the development of open specifications for all communication NW (Network) devices. The main members of the TIP are Facebook, Deutsche Telecom, Intel, NOKIA, and so on. mmWave Networks is one of the project groups of the TIP, and the goal thereof is to use millimeter wave wireless technology in the unlicensed band to construct NWs more quickly and more cheaply compared to deploying optical fiber. Note that in FIG. 35, the reference numerals 610, 611, 612, 620, 621, 622, and 623 have been added by the applicant.

Buildings 611, 621 such as commercial buildings and a building 622 such as a residence are disposed in regions 610, 620 shown in FIG. 35. A terminal station is installed on a wall surface of each of the buildings 611, 621, 622. Poles 612, 623 such as utility poles are disposed in the regions 610, 620, and base stations are installed on the poles. The base station installed on the pole 612 communicates with the terminal station installed on the wall surface of the building 611. The base station installed on the pole 623 communicates with the terminal stations installed on the wall surfaces of the buildings 621, 622. This communication is performed by millimeter wave wireless communication.

In the embodiment shown in FIG. 35, selecting candidate locations for installing the base stations and terminal stations is referred to as station installation design (also referred to hereafter as "station installation").

CITATION LIST

Patent Literature

[PTL 1] Japanese Patent No. 4295746

Non Patent Literature

[NPL 1] Sean Kinney, "Telecom Infra Project focuses on millimeter wave for dense networks, Millimeter Wave Networks Project Group eyes 60 GHz band", Image courtesy of the Telecom Infra Project, RCR Wireless News, Intelligence on all things wireless, Sep. 13, 2017, [retrieved Oct. 2, 2019], Internet (URL: https://www.rcr-wireless.com/20170913/carriers/telecom-infra-project-millimeter-wave-tag17)

[NPL 2] Frederic Lardinois, "Facebook-backed Telecom Infra Project adds a new focus on millimeter wave tech for 5G", [retrieved Oct. 2, 2019], Internet (URL: https://techcrunch.com/2017/09/12/facebook-backed-telecom-infra-project-adds-a-new-focus-on-millimeter-wave-tech-for-5 g/?renderMode=ie11)

[NPL 3] Jamie Davies, "DT and Facebook TIP the scales for mmWave", GLOTEL AWARDS 2019, telecoms.com, Sep. 12, 2017, [retrieved Oct. 2, 2019], Internet (URL: https://telecoms.com/484622/dt-and-facebook-tip-the-scales-for-mmwave/)

SUMMARY OF THE INVENTION

Technical Problem

A method using three-dimensional point cloud data acquired by photographing a space is available as a method for performing station installation design. In this method, the following processing is performed. As first processing, three-dimensional point cloud data are acquired by causing a vehicle installed with an MMS (Mobile Mapping System) to travel along roads surrounding a residential area serving as an evaluation subject. As second processing, the acquired three-dimensional point cloud data are used to calculate a range of a wall surface of an evaluation subject building that is visible from a utility pole on which a base station is installed. The calculated range serves as a candidate location for installing a terminal station.

Even when a comparatively easy method for evaluating the visibility is employed in a method for evaluating the quality of wireless communication, it is necessary to handle the point cloud data of three-dimensional data. Hence, a huge amount of calculation, or in other words a huge amount of calculation resources and calculation time, is required. It is therefore effective to employ a method of narrowing down the base station and terminal station candidate locations on a two-dimensional map and carrying out evaluations using only partial point cloud data between the base stations and terminal stations in the narrowed-down candidate locations or on the periphery thereof.

When this method is employed, in order to evaluate the visibility in relation to a single base station, it is necessary to evaluate the visibility with respect to the base stations on all of the buildings existing within a range specified on the map. However, this leads to a problem in that the evaluation is laborious and time-consuming. To solve this problem, a method for evaluating the visibility in a horizontal direction from the base station using two-dimensional map data may be considered.

When the visibility in a horizontal direction from the base station is evaluated using two-dimensional map data, buildings that have other buildings between themselves and the base station are shielded by the other buildings. Therefore, buildings that have other buildings between themselves and the base station are excluded from the terminal station installation candidates on the assumption that the buildings are not visible from the base station. In actuality, however, these buildings may be visible when seen from the altitude at which the base station is installed.

However, in order to determine the visibility to a building from a base station while taking into consideration the height above sea level at which the base station is installed and the height above sea level of the building, as shown in FIG. 8 of PTL1, for example, height direction information, which is eliminated when two-dimensional map data is used, is restored. When the height direction information is restored, the amount of data increases, leading to an increase in the calculation amount.

In consideration of the circumstances described above, an object of the present invention is to provide a technique with which visibility can be detected even in relation to buildings that have other buildings between themselves and a base station without greatly increasing the calculation amount when evaluating the visibility using two-dimensional map data.

Means for Solving the Problem

An aspect of the present invention is a station installation support method including a vertical direction English Translation of visibility detection subject building selecting step for setting, on two-dimensional map data indicating buildings serving as candidates for installing terminal station devices, locations of base station installation structures serving as candidates for installing base station devices as base station candidate locations, and selecting, for each of the base station candidate locations, buildings that have other buildings between themselves and the base station candidate location as visibility detection subject buildings, a vertical direction visibility detection processing step for setting the heights of the buildings at an identical length, setting a higher position than the buildings as an installation altitude of the base station devices, and detecting, for each of the visibility detection subject buildings selected in the vertical direction visibility detection subject building selecting step, a visibility range of the visibility detection subject building from the installation altitude of the base station device in the base station candidate location, and a point cloud data processing step for narrowing down, on the basis of the detected visibility ranges, three-dimensional point cloud data acquired by photographing a region including the base station installation structures and the buildings, and using the narrowed-down point cloud data to determine the visibility of the buildings from the base station candidate locations.

An aspect of the present invention is the station installation support method described above, wherein the vertical direction visibility detection processing step includes a representative direction line generating step for generating, for each of the base station candidate locations, a representative direction line, which is a straight line that originates from the base station candidate location and is oriented in a direction that intersects a predetermined location on the visibility detection subject building, a visibility detection subject wall surface detecting step for detecting a location that is closest to the base station candidate location, among locations where a contour of the visibility detection subject building and the representative direction line intersect, as a location of a visibility detection subject wall surface of the visibility detection subject building, and calculating a distance on a horizontal plane between the detected location of the visibility detection subject wall surface and the base station candidate location as a visibility detection subject wall surface distance, a shielding wall surface detecting step for detecting building wall surfaces that intersect the representative direction line in order from the wall surface closest to the base station candidate location, detecting a location where the building wall surface detected immediately before the visibility detection subject wall surface intersects the representative direction line as the location of a shielding wall surface, and calculating a distance on a horizontal plane between the detected location of the shielding wall surface and the base station candidate location as a shielding wall surface distance, and a visibility range detecting step for detecting a visibility range of the visibility detection subject wall surface in relation to each of the representative direction lines on the basis of the height of the buildings, the installation altitude of the base station device corresponding to the base station candidate location, the visibility detection subject wall surface distance, and the shielding wall surface distance.

An aspect of the present invention is the station installation support method described above, including a road classification processing step for classifying roads indicated on the two-dimensional map data as either an evaluation reference road that serves as a reference for determining a visibility evaluation subject range or an evaluation boundary road for determining a boundary of the visibility evaluation subject range in relation to each of the base station candidate locations, and an evaluation subject detecting step for detecting, for each of the base station candidate locations, an evaluation subject set, which is a set of buildings included in the visibility evaluation subject range, on the basis of the evaluation reference road and the evaluation boundary road corresponding to the base station candidate location, wherein, in the vertical direction visibility detection subject building selecting step, the buildings that have other buildings between themselves and the base station candidate location are selected from the buildings included in the evaluation subject set as the visibility detection subject buildings.

An aspect of the present invention is the station installation support method described above, wherein, in the evaluation subject detecting step, the buildings facing the evaluation reference road corresponding to the base station candidate location are detected for each of the base station candidate locations, the detected buildings are added to the evaluation subject set, every time a new building is added to the evaluation subject set, an addition candidate set, which is a set of the buildings existing near the added building, is generated, and all of the buildings not facing the evaluation boundary road corresponding to the base station candidate location, among the buildings included in the generated addition candidate set, are added to the evaluation subject set repeatedly until one of the buildings included in the generated addition candidate set faces the evaluation boundary road corresponding to the base station candidate location.

An aspect of the present invention is the station installation support method described above, wherein, in the evaluation subject detecting step, building detection lines that originate from the base station candidate location and extend in directions determined as desired are generated for each of the base station candidate locations, for each of the building detection lines, the first building that intersects the building detection line is detected and the detected building is added to an evaluation subject set, every time a new building is added to the evaluation subject set, an addition candidate set, which is a set of the buildings existing near the added building, is generated, and all of the buildings not facing the evaluation boundary road corresponding to the base station candidate location, among the buildings included in the generated addition candidate set, are added to the evaluation subject set repeatedly until one of the buildings included in the generated addition candidate set faces the evaluation boundary road corresponding to the base station candidate location.

An aspect of the present invention is the station installation support method described above, wherein, in the road classification processing step, for each of the base station candidate locations, a road to which the location indicated by the base station candidate location belongs is classified as the evaluation reference road, while a road to which a location indicated by a base station candidate location other than the base station candidate location corresponding to the evaluation reference road belongs is classified as the evaluation boundary road.

An aspect of the present invention is the station installation support method described above, wherein, in the road classification processing step, the roads included in the English Translation of two-dimensional map data are divided by intersections, whereupon the divided roads are each classified as either the evaluation reference road or the evaluation boundary road, or a continuous road among the roads included in the two-dimensional map data is regarded as a single road, whereupon the roads are each classified as either the evaluation reference road or the evaluation boundary road.

An aspect of the present invention is a station installation support device including a vertical direction visibility detection subject building selection unit for setting, on two-dimensional map data indicating buildings serving as candidates for installing terminal station devices, locations of base station installation structures serving as candidates for installing base station devices as base station candidate locations, and selecting, for each of the base station candidate locations, buildings that have other buildings between themselves and the base station candidate location as visibility detection subject buildings, a vertical direction visibility detection processing unit for setting the heights of the buildings at an identical length, setting a higher position than the buildings as an installation altitude of the base station devices, and detecting, for each of the visibility detection subject buildings selected by the vertical direction visibility detection subject building selecting unit, a visibility range of the visibility detection subject building from the installation altitude of the base station device in the base station candidate location, and a point cloud data processing unit for narrowing down, on the basis of the detected visibility ranges, three-dimensional point cloud data acquired by photographing a region including the base station installation structures and the buildings, and using the narrowed-down point cloud data to determine the visibility of the buildings from the base station candidate locations.

Effects of the Invention

According to the present invention, visibility can be detected even in relation to buildings that have other buildings between themselves and a base station without greatly increasing the calculation amount when evaluating the visibility using two-dimensional map data. In other words, even in a case where another building intersects a line segment drawn on a plane from a utility pole on which a base station is installed to a building on which a terminal station is installed, the visibility of the terminal station from the height of the installation position of the base station can be determined to a certain degree.

BRIEF DESCRIPTION OF DRAWINGS

FIG. 22 is a view showing an outline (4) of the processing performed by the vertical direction visibility detection processing unit according to the third embodiment.

DESCRIPTION OF EMBODIMENTS

First Embodiment

Figure 1:
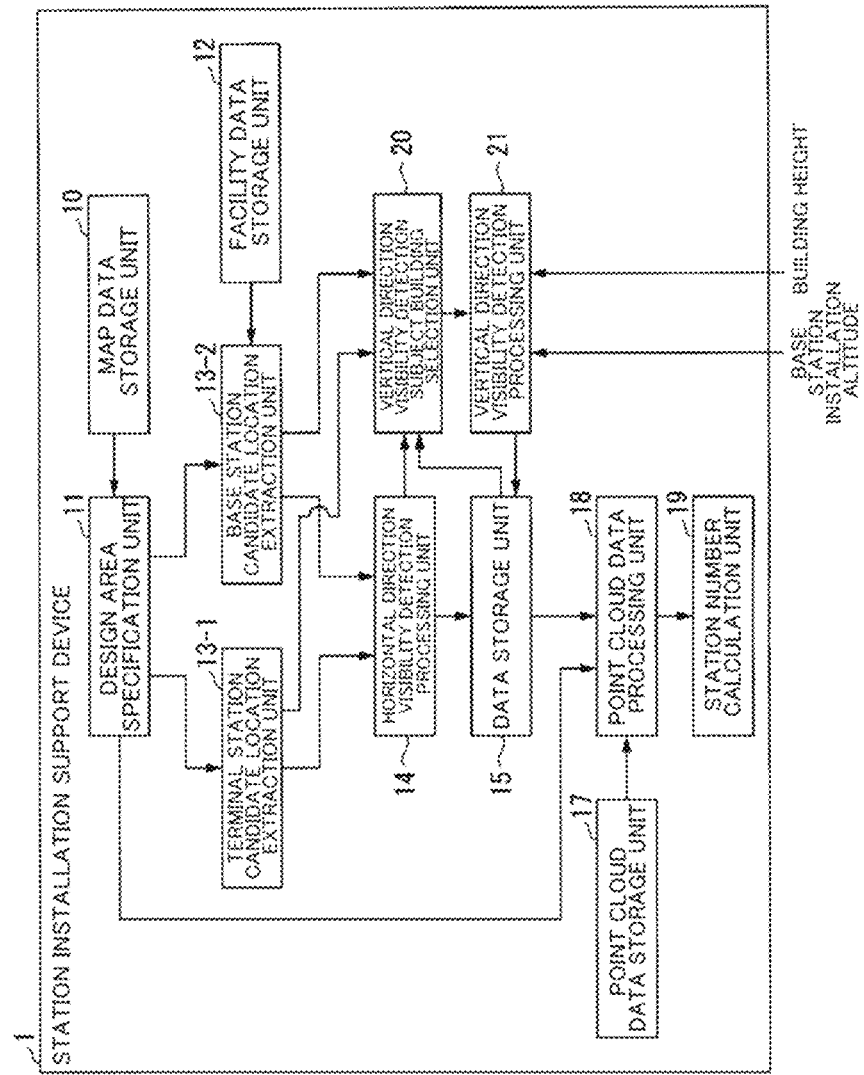
FIG. 1 is a block diagram showing a configuration of a station installation support device according to a first embodiment.

An embodiment of the present invention will be described below with reference to the figures. FIG. 1 is a block diagram showing a configuration of a station installation support device 1 according to a first embodiment. The station installation support device 1 includes a map data storage unit 10, a design area specification unit 11, an equipment data storage unit 12, a terminal station candidate location extraction unit 13-1, a base station candidate location extraction unit 13-2, a horizontal direction visibility detection processing unit 14, a data storage unit 15, a point cloud data storage unit 17, a point cloud data processing unit 18, a station number calculation unit 19, a vertical direction visibility detection subject building selection unit 20, and a vertical direction visibility detection processing unit 21.

First, the data stored by the map data storage unit 10, the equipment data storage unit 12, the data storage unit 15, and the point cloud data storage unit 17 of the station installation support device 1 will be described.

The map data storage unit 10 stores two-dimensional map data. The map data include data indicating the locations and shapes of buildings that serve as candidates for installing terminal stations and data indicating roads.

The equipment data storage unit 12 stores base station candidate location data indicating locations of base station installation structures, which are outdoor equipment such as utility poles that serve as candidates for installing base stations.

The data storage unit 15 stores data indicating visibility ranges of buildings, which are detected in relation to each base station by the horizontal direction visibility detection processing unit 14 and the vertical direction visibility detection processing unit 21, and so on.

The point cloud data storage unit 17 stores three-dimensional point cloud data acquired using an MMS, for example.

The map data storage unit 10, the equipment data storage unit 12, the data storage unit 15, and the point cloud data storage unit 17 are configured using a storage device such as a magnetic hard disk device or a semiconductor storage device.

Configurations of the respective function units of the station installation support device 1 and processing performed in a station installation support method executed by the station installation support device 1 will be described below with reference to a flowchart shown in FIG. 2.

The design area specification unit 11 reads the two-dimensional map data from the map data storage unit 10. The design area specification unit 11 writes the read map data to a working memory, for example, so that the map data are stored therein (step S1-1). The design area specification unit 11 selects a rectangular area determined as appropriate from the map data stored in the working memory. The design area specification unit 11 specifies the selected area as a design area (step S1-2).

The terminal station candidate location extraction unit 13-1 extracts building contour data indicating the locations and shapes of the buildings, or in other words coordinates of the contours of the buildings, from the map data within the design area for each building (step S2-1). The building contour data extracted by the terminal station candidate location extraction unit 13-1 are data indicating wall surfaces of the buildings on which a terminal station can be installed and are therefore regarded as candidate locations for installing terminal stations.

Here, the building contour data include data indicating the coordinates of a plurality of vertices included on the contour of the building and data indicating adjacency relationships between the vertices. By connecting the coordinates of the vertices using straight lines on the basis English Translation of of the data indicating the adjacency relationships between the vertices, it is possible to specify the shape of the building. Note that the coordinates of the vertices of the building are coordinates represented by an X coordinate value and a Y coordinate value in a case where an orthogonal coordinate system, for example, in which the horizontal axis is set as the X axis and the vertical axis is set as the Y axis, is applied to the map data stored in the map data storage unit 10.

The terminal station candidate location extraction unit 13-1 generates building identification data constituted by identification information from which it possible to identify each individual building univocally, and attaches the generated data to the building contour data extracted for each building. The terminal station candidate location extraction unit 13-1 outputs the attached building identification data in association with the building contour data of the corresponding building.

The base station candidate location extraction unit 13-2 reads the base station candidate location data corresponding to the base station installation structures located in the specified design area from the equipment data storage unit 12 and outputs the read data (step S3-1). Note that when the map data stored in the map data storage unit 10 and the coordinates of the base station candidate location data stored in the equipment data storage unit 12 do not match, the base station candidate location extraction unit 13-2 converts the coordinates of the read base station candidate location data so as to align with the coordinate system of the map data.

The horizontal direction visibility detection processing unit 14 uses the building contour data output for each building by the terminal station candidate location extraction unit 13-1 to determine, for each set of the base station candidate location data output by the base station candidate location extraction unit 13-2, the visibility of each building in a horizontal direction from the location indicated by the base station candidate location data. The horizontal direction visibility detection processing unit 14 detects a visible contour range of a building determined to be visible, or in other words the visible wall surfaces of the building, as a visibility range (step S4-1).

The horizontal direction visibility detection processing unit 14 further selects a priority wall surface candidate of the building for installing a terminal station from among the wall surfaces of the building corresponding to the detected visibility range. When the visibility range of a certain building includes a plurality of wall surfaces, the horizontal direction visibility detection processing unit 14 sets the wall surface that is closest to the base station, for example, as the priority wall surface for installing a terminal station, and this wall surface is selected as a final horizontal direction visibility range.

The horizontal direction visibility detection processing unit 14 writes the building identification data of the buildings having a detected visibility range in the horizontal direction and data indicating the horizontal direction visibility ranges of the buildings associatively to the data storage unit 15 for each base station so that the data are stored therein (step S4-2). As a result, the building identification data of the buildings and data indicating the horizontal direction visibility ranges of the buildings corresponding to the building identification data are stored in the data storage unit 15 for each set of base station candidate location data.

The horizontal direction visibility detection processing unit 14 determines whether or not an instruction to consider buildings that have other buildings between themselves and the base station has been received as a result of an operation performed by a user of the station installation support device 1 (step S4-3). After determining that an instruction to consider buildings that have other buildings between themselves and the base station has not been received (step S4-3, No), the horizontal direction visibility detection processing unit 14 advances the processing to step 35-1. After determining that an instruction to consider buildings that have other buildings between themselves and the base station has been received (step S4-3, Yes), on the other hand, the horizontal direction visibility detection processing unit 14 advances the processing to step S4-4.

In relation to each set of base station candidate location data, the vertical direction visibility detection subject building selection unit 20 detects, from among the buildings in the design area, buildings that have other buildings between themselves and the location indicated by the base station candidate location data as vertical direction visibility detection subject buildings. For example, by referring to the data storage unit 15, the vertical direction visibility detection subject building selection unit 20 sets, for each set of base station candidate location data, buildings for which the horizontal direction visibility detection processing unit 14 has not detected a horizontal direction visibility range as buildings that have other buildings between themselves and the location indicated by the base station candidate location data, and detects these buildings as vertical direction visibility detection subject buildings (hereafter, the vertical direction visibility detection subject buildings will also be referred to simply as "visibility detection subject buildings").

The vertical direction visibility detection processing unit 21, upon reception of an operation performed by the user of the station installation support device 1, for example, imports, from the outside, data indicating the installation altitude of the base stations, which is specified by the user, and data indicating a building height of an identical length for all of the buildings. Note that the installation altitude of the base stations is a height at which base station devices are installed on utility poles, for example, in a case where utility poles are disposed as base station installation structures in the locations indicated by the base station candidate location data. The installation altitude takes a value of approximately "10 m", for example, which is the height of a utility pole for transmitting electric power, while the building height takes a value of approximately "6 m", for example, which is the height of a two-story residence. Furthermore, the installation altitude may be different or take an identical value for each base station.

The vertical direction visibility detection processing unit 21 uses the imported data indicating the building height to detect the vertical direction visibility range from the height of the installation altitude in the location of the base station for each visibility detection subject building relating to each base station, detected by the vertical direction visibility detection subject building selection unit 20. The vertical direction visibility detection processing unit 21 writes the building identification data of the buildings for which a vertical direction visibility range has been detected and the data indicating the detected vertical direction visibility ranges of the buildings English Translation of associatively to the data storage unit 15 so that the data are stored therein (step S4-4). As a result, the building identification data of the buildings and data indicating the vertical direction visibility ranges of the buildings corresponding to the building identification data are stored in the data storage unit 15 for each set of base station candidate location data.

The point cloud data processing unit 18 receives the data indicating the design area from the design area specification unit 11 and reads point cloud data corresponding to the design area from the point cloud data storage unit 17 (step S5-1). Referring to the data storage unit 15, the point cloud data processing unit 18 uses the three-dimensional point cloud data to determine, on the basis of the data indicating the horizontal direction and vertical direction visibility ranges of each building, the visibility between the base stations and terminal stations that have visibility when narrowed down to two dimensions, and in so doing estimates the possibility of communication (step S5-2).

The station number calculation unit 19 calculates a required number of base stations and a number of accommodated terminal stations for each base station by aggregating the locations of the base stations and the locations of the terminal stations on the basis of the results of the visibility determination and estimation of the possibility of communication, performed by the point cloud data processing unit 18 using the three-dimensional point cloud data (step S6-1).

Figure 3:
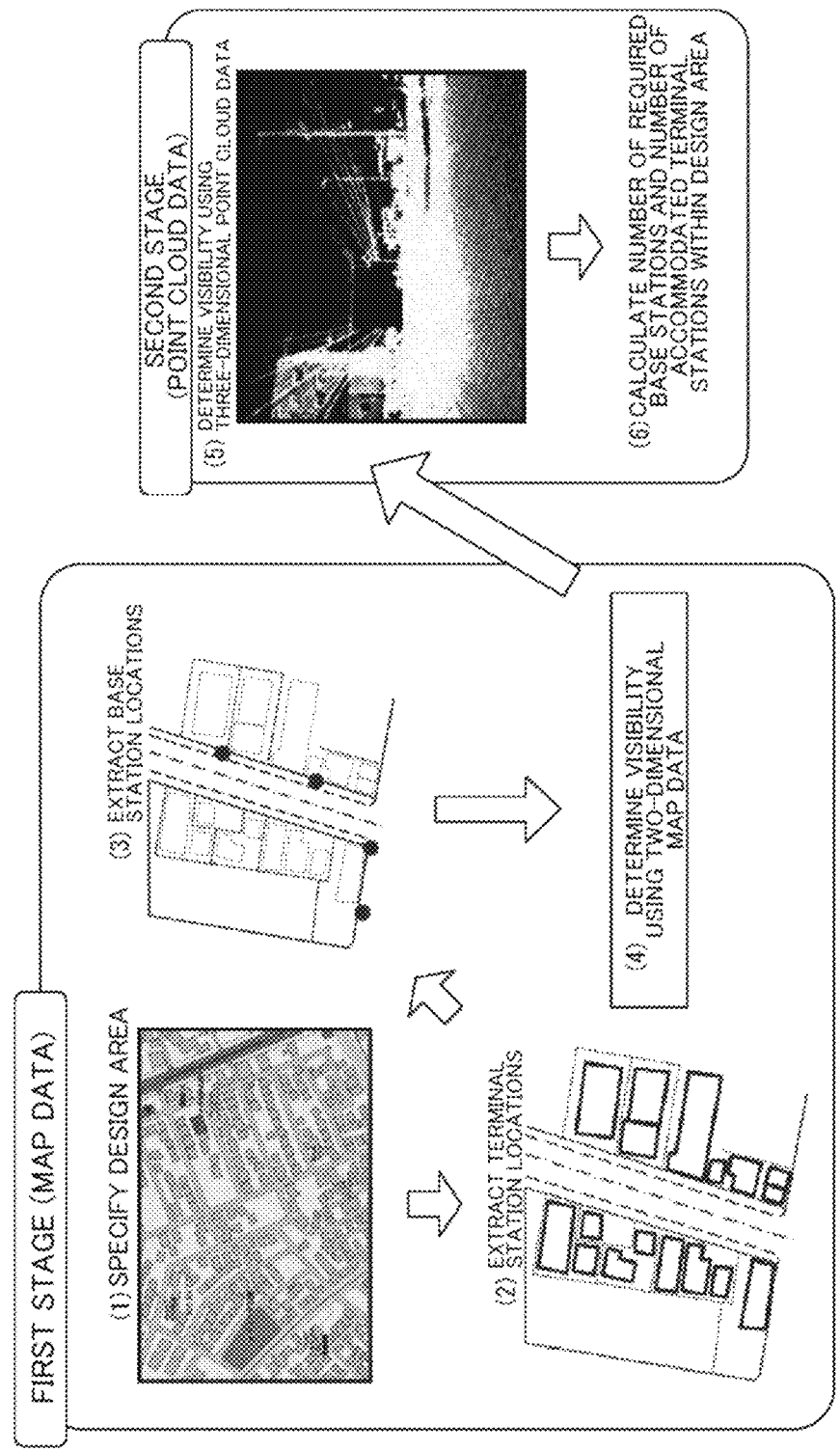
FIG. 3 is a view illustrating the processing of the first embodiment split into two stages.

As shown in FIG. 3, the processing of the station installation support device 1 may be regarded as two-stage processing consisting of the processing performed using the map data, which are two-dimensional data, and the processing performed using the point cloud data, which are three-dimensional data, upon reception of the result of the first-stage processing.

As shown in FIG. 3, the first-stage processing performed using the map data, which are two-dimensional data, includes four processes, namely (1) specification of the design area, (2) extraction of the terminal station locations, (3) extraction of the base station locations, and (4) the visibility determination using the two-dimensional map data.

(1) The processing for specifying the design area corresponds to the processing of steps S1-1 and S1-2, performed by the design area specification unit 11. (2) The processing for extracting the terminal station locations corresponds to the processing of step S2-1, performed by the terminal station candidate location extraction unit 13-1. (3) The processing for extracting the base station locations corresponds to the processing of step S3-1, performed by the base station candidate location extraction unit 13-2. (4) The processing of the visibility determination using the two-dimensional map data corresponds to the processing of steps S4-1, S4-2, S4-3, and S4-4, performed by the horizontal direction visibility detection processing unit 14, the vertical direction visibility detection subject building selection unit 20, and the vertical direction visibility detection processing unit 21.

The second-stage processing performed using the point cloud data, which are three-dimensional data, includes two processes, namely (5) the visibility determination using the three-dimensional point cloud data, and (6) calculation of the number of required base stations and the number of accommodated terminal stations in the design area. (5) The processing of the visibility determination using the three-dimensional point cloud data corresponds to the processing of steps S5-1 and S5-2, performed by the point cloud data processing unit 18. (6) The processing for calculating the number of required base stations and the number of accommodated terminal stations in the design area corresponds to the processing of step S6-1, performed by the station number calculation unit 19.

(Processing Performed by Horizontal Direction Visibility Detection Processing Unit) The horizontal direction visibility range detection processing performed by the horizontal direction visibility detection processing unit 14 and corresponding to steps S4-1 and S4-2 in FIG. 2 will now be described with reference to FIG. 4. The horizontal direction visibility detection processing unit 14 imports the base station candidate location data output by the base station candidate location extraction unit 13-2. The horizontal direction visibility detection processing unit 14 also imports the building identification data output by the terminal station candidate location extraction unit 13-1 and the building contour data associated with the building identification data.

Figure 4:
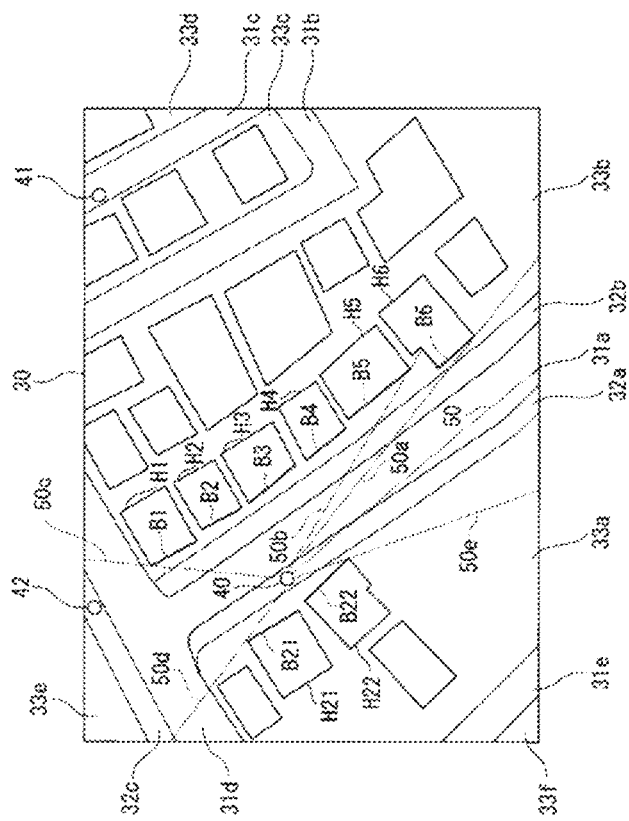
FIG. 4 is a view showing an outline (1) of processing performed by a horizontal direction visibility detection processing unit according to the first embodiment.

Map data 30 shown in FIG. 4 are map data acquired by cutting out a region included in the design area specified by the design area specification unit 11 from the map data stored in the map data storage unit 10. As shown in FIG. 4, roads 31a, 31b, 31c, 31d, and 31e, sidewalks 32a, 32b, and 32c, zones 33a, 33b, 33c, 33d, 33e, and 33f in which buildings are disposed, and utility poles 40, 41, 42, for example, are depicted on the map data 30. The locations of the utility poles 40, 41, 42 correspond to the locations indicated by the base station candidate location data.

Contours representing the shapes of the buildings are depicted in each of the zones 33a, 33b, 33c, 33d, for example. For example, contours representing the shapes of buildings H21, H22, and so on are depicted in the zone 33a, while contours representing the shapes of buildings H1 to H6 and so on are depicted in the zone 33b.

The horizontal direction visibility detection processing unit 14 selects one set of base station candidate location data. Here, the location indicated by the base station candidate location data selected by the horizontal direction visibility detection processing unit 14 is assumed to be the location of the utility pole 40. The horizontal direction visibility detection processing unit 14 generates a visibility detection line 50, which is a straight line originating from the location of the utility pole 40, along the road 31a on which the utility pole 40 is installed. The horizontal direction visibility detection processing unit 14 rotates the visibility detection line 50 counterclockwise by a predetermined rotation angle, for example. Straight dotted lines indicated by reference symbols 50a to 50e in FIG. 4 illustrate the process of rotating the visibility detection line 50 counterclockwise, and hereafter, these lines will be referred to as visibility detection lines 50a to 50e.

Having detected that the visibility detection line 50a intersects the contour of the building H6, the horizontal direction visibility detection processing unit 14 detects an intersection between the visibility detection line 50a and the contour of the building H6. The horizontal direction visibility detection processing unit 14 then rotates the visibility detection line 50a further and continues to detect intersections with the contour of the building H6 until the visibility detection line 50a reaches the position of the visibility detection line 50b, which intersects the contour of the building H5. The horizontal direction visibility detection processing unit 14 then connects the respective intersections English Translation of detected in relation to the same building H6. In FIG. 4, a thick dotted line that extends around the contour of the building H6 and is indicated by the reference symbol B6 is a line segment formed by connecting the intersections, and this line segment serves as the visibility range of the building H6 (referred to hereafter as the visibility range B6).

By repeating this processing, the horizontal direction visibility detection processing unit 14 rotates the visibility detection line 50b further until the visibility detection line 50b reaches the position of the visibility detection line 50c and thereby detects horizontal direction visibility ranges B5 to B1 corresponding to the buildings H5 to H1. Similarly, by rotating the visibility detection line 50d until the visibility detection line 50d reaches the position of the visibility detection line 50e, the horizontal direction visibility detection processing unit 14 detects horizontal direction visibility ranges B21, B22 corresponding respectively to the buildings H21 and H22.

Next, when the visibility range of a certain building includes two or more wall surfaces of the building, the horizontal direction visibility detection processing unit 14 selects one of the wall surfaces as a priority wall surface for installing a terminal station.

Figure 5:
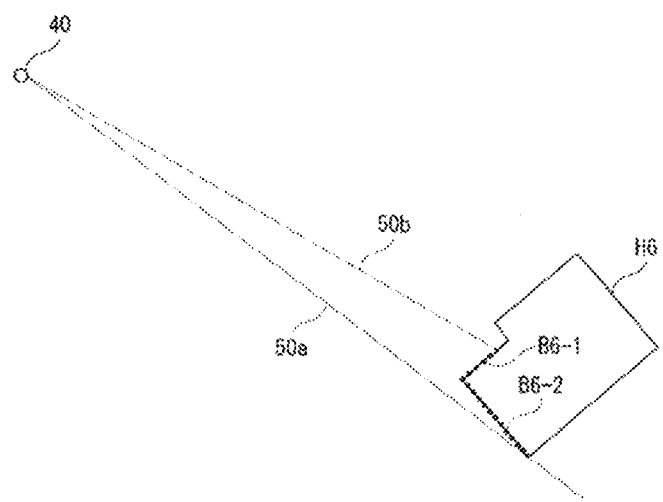
FIG. 5 is a view showing an outline (2) of the processing performed by the horizontal direction visibility detection processing unit according to the first embodiment.

FIG. 5 is an enlarged view showing a positional relationship between the building H6 and the utility pole 40 in FIG. 4. The visibility range B6 of the building H6 extends over two wall surfaces of the building H6, and in FIG. 5, the visibility range B6 is divided into two visibility ranges B6-1 and B6-2 corresponding to the respective wall surfaces. Of the two wall surfaces included in the visibility range B6, the horizontal direction visibility detection processing unit 14 selects the wall surface that is closer to the utility pole 40, for example, as the priority wall surface for installing a terminal station, and sets the visibility range B6-1 belonging to the selected wall surface as the final horizontal direction visibility range of the building H6.

The horizontal direction visibility detection processing unit 14 associates the building identification data of the buildings H1 to H6 and the buildings H21 and H22 for which horizontal direction visibility ranges have been detected respectively with data indicating the horizontal direction visibility ranges B1 to B5 and B6-1 and the horizontal direction visibility ranges B21 and B22 of the buildings H1 to H6 and the buildings H21 and H22. The horizontal direction visibility detection processing unit 14 further associates the base station candidate location data corresponding to the utility pole 40 with the associated building identification data and visibility range data and then writes the resulting data to the data storage unit 15 so that the data are stored therein.

Once the horizontal direction visibility detection processing unit 14 has detected horizontal direction visibility ranges for all of the base stations, data indicating the horizontal direction visibility ranges of the buildings H1, H2, . . . are stored in the data storage unit 15 for the base station candidate location data corresponding respectively to all of the base stations included within the range of the design area.

(Processing Performed by Vertical Direction Visibility Detection Subject Building Selection Unit)

Figure 2:
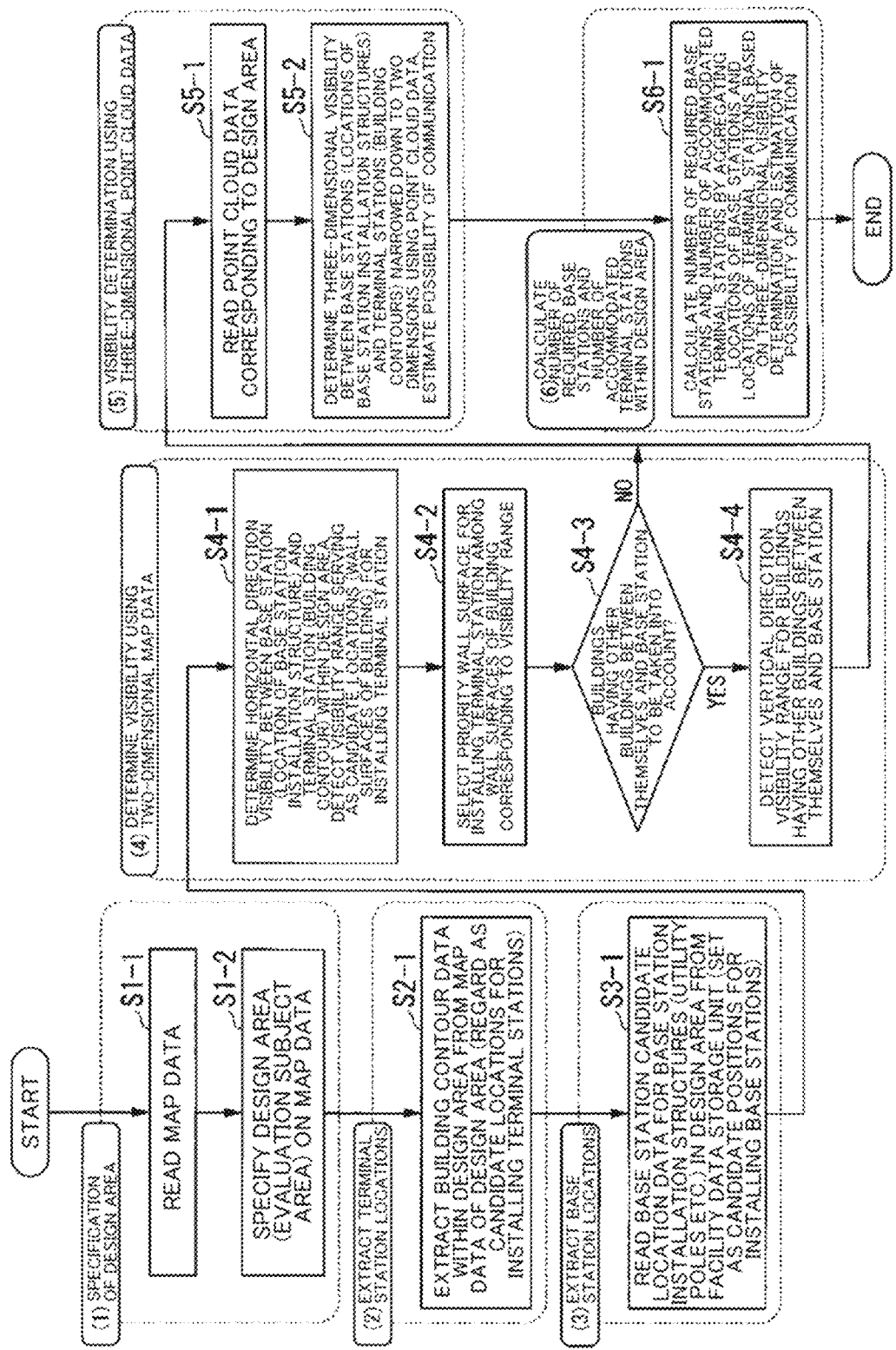
FIG. 2 is a flowchart showing a flow of processing performed by the station installation support device according to the first embodiment.

When, as shown in step S4-3 of FIG. 2, the horizontal direction visibility detection processing unit 14 determines that an instruction to consider buildings that have other buildings between themselves and the base station has been received as a result of an operation performed by the user of the station installation support device 1 (step S4-3, Yes), the horizontal direction visibility detection processing unit 14 outputs instruction data instructing the start of vertical direction visibility detection processing to the vertical direction visibility detection subject building selection unit 20.

Figure 6:
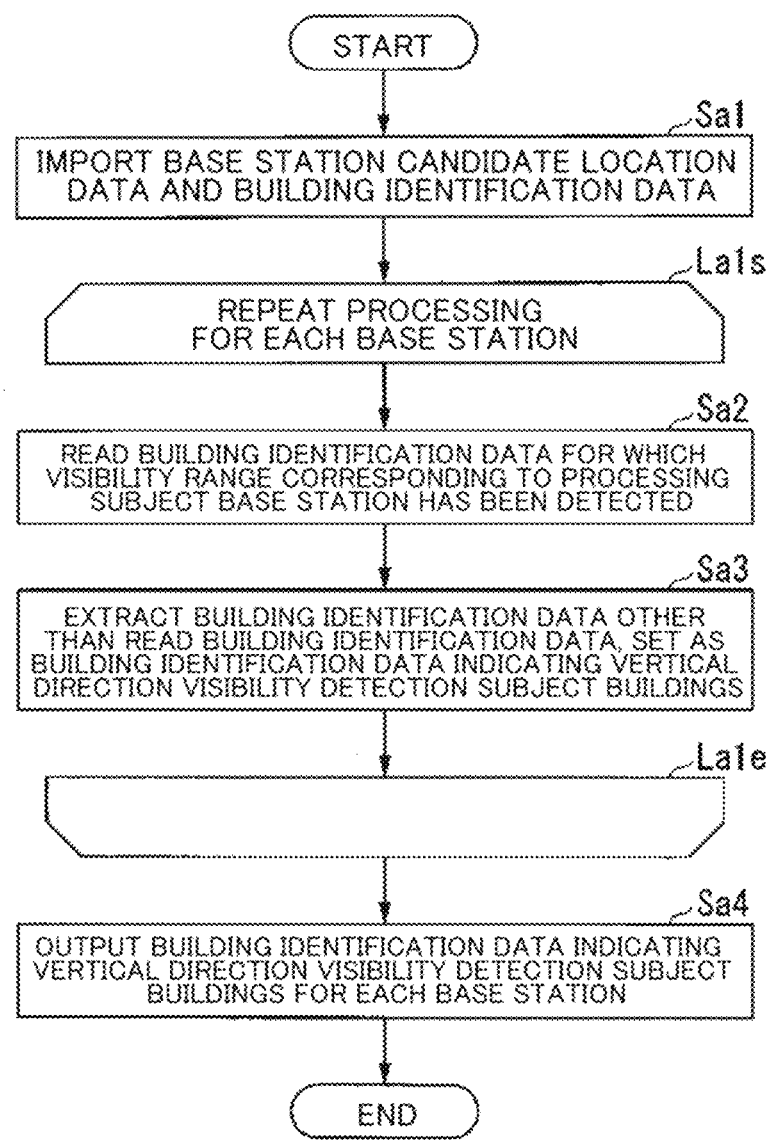
FIG. 6 is a flowchart showing a flow of processing performed by a vertical direction visibility detection subject building selection unit according to the first embodiment.

The vertical direction visibility detection subject building selection unit 20, having received the instruction data instructing the start of vertical direction visibility detection processing from the horizontal direction visibility detection processing unit 14, starts the processing of a flowchart shown in FIG. 6, which corresponds to a part of the processing of step S4-4 in FIG. 2.

The vertical direction visibility detection subject building selection unit 20 imports the base station candidate location data output by the base station candidate location extraction unit 13-2, the building identification data output by the terminal station candidate location extraction unit 13-1, and the building contour data associated with the building identification data (step Sa1).

The vertical direction visibility detection subject building selection unit 20 selects the imported base station candidate location data one set at a time and performs the processing of steps Sa2 and Sa3, described below, repeatedly (loop La1s to La1e).

By referring to the data storage unit 15, the vertical direction visibility detection subject building selection unit 20 reads the building identification data for which horizontal direction visibility ranges corresponding to the selected base station candidate location data are stored (step Sa2). The vertical direction visibility detection subject building selection unit 20 then extracts the building identification data other than the building identification data read from the data storage unit 15 from the building identification data output by the terminal station candidate location extraction unit 13-1.

The buildings indicated by the building identification data extracted by the vertical direction visibility detection subject building selection unit 20 are buildings, within the selected base station candidate location data, for which a horizontal direction visibility range has not been detected, or in other words buildings that have other buildings between themselves and the location indicated by the selected base station candidate location data. The vertical direction visibility detection subject building selection unit 20 sets the buildings indicated by the extracted building identification data as visibility detection subject buildings corresponding to the selected base station candidate location data (step Sa3).

For example, when the utility pole disposed in the location indicated by the selected base station candidate location data is the utility pole 40, the building identification data stored in the data storage unit 15, for which visibility ranges have been detected, are the building identification data of the buildings H1 to H6 and the buildings H21 and H22, as shown in FIG. 4. In this case, the vertical direction visibility detection subject building selection unit 20 extracts buildings H7 to H14, buildings H23 and H24, buildings H31 to H33, and a building H41, depicted by solid lines in FIG. 7, as the visibility detection subject buildings.

Figure 7:
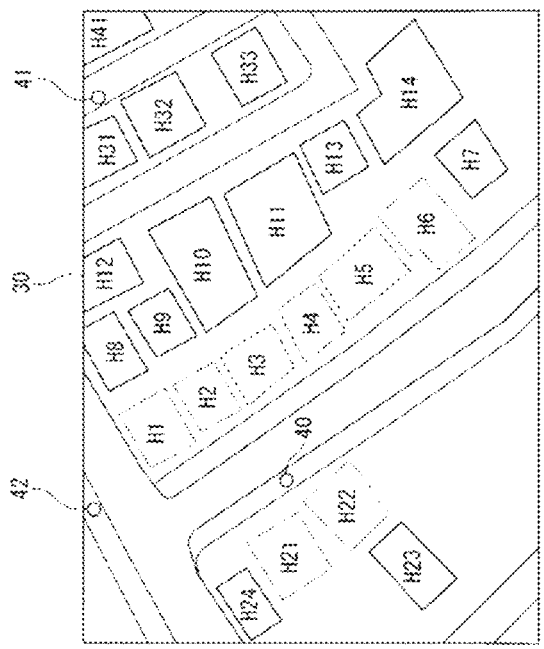
FIG. 7 is a view showing an outline of the processing performed by the vertical direction visibility detection subject building selection unit according to the first embodiment.

Note that in FIG. 7, from the viewpoint of facilitating viewing of the figure, the reference symbols H1, H2, . . . , and so on indicating the buildings are shown inside the contours of the buildings. Further, from the viewpoint of facilitating viewing of the figures, the reference symbols indicating buildings are shown in a similar manner from FIG. 7 onward.

Having completed the processing of step Sa3 in relation to the final set of base station candidate location data, the vertical direction visibility detection subject building selection unit 20 outputs the building identification data indicating the visibility detection subject buildings extracted for each set of base station candidate location data to the vertical direction visibility detection processing unit 21 in association with the base station candidate location data corresponding respectively thereto (step Sa4). Further, during the processing of step Sa4, the vertical direction visibility detection subject building selection unit 20 outputs the building identification data of all of the buildings included in the design area, imported from the terminal station candidate location extraction unit 13-1, and the building contour data associated respectively with the building identification data to the vertical direction visibility detection processing unit 21.

(Configuration of Vertical Direction Visibility Detection Processing Unit)

Figure 8:
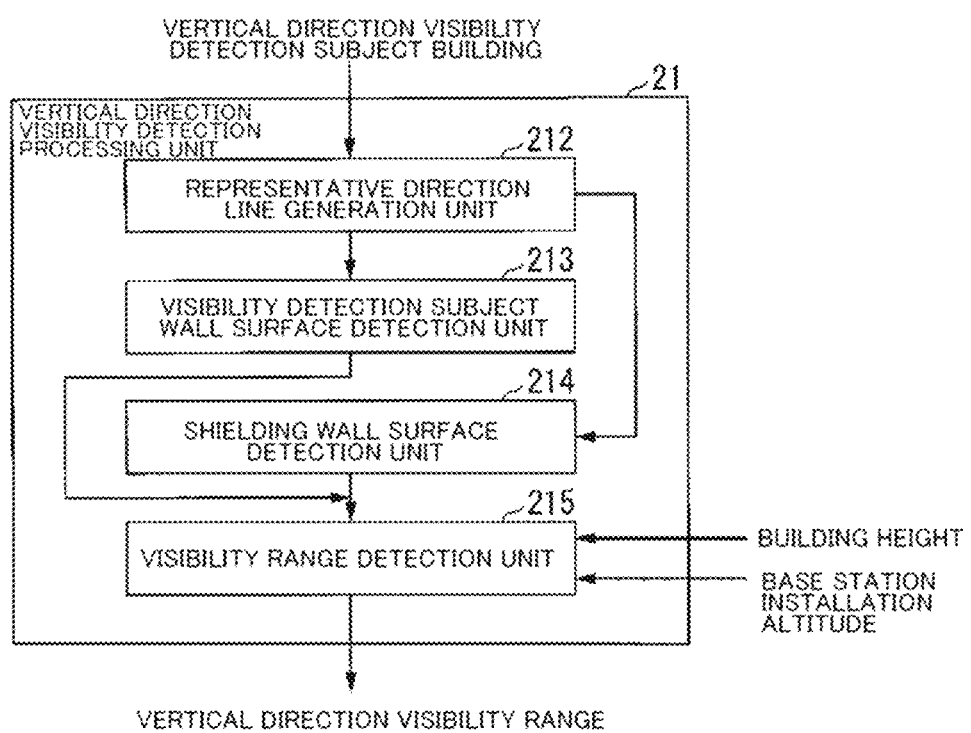
FIG. 8 is a block diagram showing a configuration of a vertical direction visibility detection processing unit according to the first embodiment.

FIG. 8 is a block diagram showing an internal configuration of the vertical direction visibility detection processing unit 21. The vertical direction visibility detection processing unit 21 includes a representative direction line generation unit 212, a visibility detection subject wall surface detection unit 213, a shielding wall surface detection unit 214, and a visibility range detection unit 215.

The representative direction line generation unit 212 imports the base station candidate location data and the building identification data indicating the visibility detection subject buildings associated respectively with the base station candidate position data, output by the vertical direction visibility detection subject building selection unit 20. The representative direction line generation unit 212 also imports the building identification data of all of the buildings included in the design area and the building contour data respectively associated with the building identification data, output by the vertical direction visibility detection subject building selection unit 20.

With respect to each set of base station candidate location data, the representative direction line generation unit 212 generates, for each of the visibility detection subject buildings corresponding to the base station candidate location data, a representative direction line, which is a straight line that originates from the location indicated by the base station candidate location data and is oriented in a direction that intersects a predetermined location on the visibility detection subject building. In other words, the representative direction line generation unit 212 generates representative direction lines in a number that matches the number of visibility detection subject buildings. Here, the predetermined position on the visibility detection subject building is the center of gravity of the shape of the visibility detection subject building, for example, and is calculated by the representative direction line generation unit 212 for each visibility detection subject building on the basis of the building contour data corresponding to the visibility detection subject building.

The visibility detection subject wall surface detection unit 213 detects the location that is closest to the location indicated by the base station candidate location data, among the locations where the contour of the visibility detection subject building and the representative direction line intersect, as the location of a visibility detection subject wall surface of the visibility detection subject building. The visibility detection subject wall surface detection unit 213 then calculates a distance on a horizontal plane between the detected location of the visibility detection subject wall surface and the location indicated by the base station candidate location data as a visibility detection subject wall surface distance.

The shielding wall surface detection unit 214 detects building wall surfaces that intersect the representative direction line in order from the wall surface closest to the location indicated by the base station candidate location data, and detects the location where the building wall surface that is detected immediately before the visibility detection subject wall surface intersects the representative direction line as the location of a shielding wall surface. The shielding wall surface detection unit 214 then calculates a distance on a horizontal plane between the detected location of the shielding wall surface and the location indicated by the base station candidate location data as a shielding wall surface distance.

The visibility range detection unit 215 imports the data indicating the installation altitude of the base station, which is specified by the user, and the data indicating a building height of an identical length for all of the buildings in response to an operation performed by the user of the station installation support device 1, for example.

The visibility range detection unit 215 detects, for each representative direction line, a vertical direction visibility range on the visibility detection subject wall surface of the visibility detection subject building corresponding to the representative direction line on the basis of the installation altitude of the base station device, the visibility detection subject wall surface distance, and the shielding wall surface distance.

(Processing Performed by Vertical Direction Visibility Detection Processing Unit)

Figure 9:
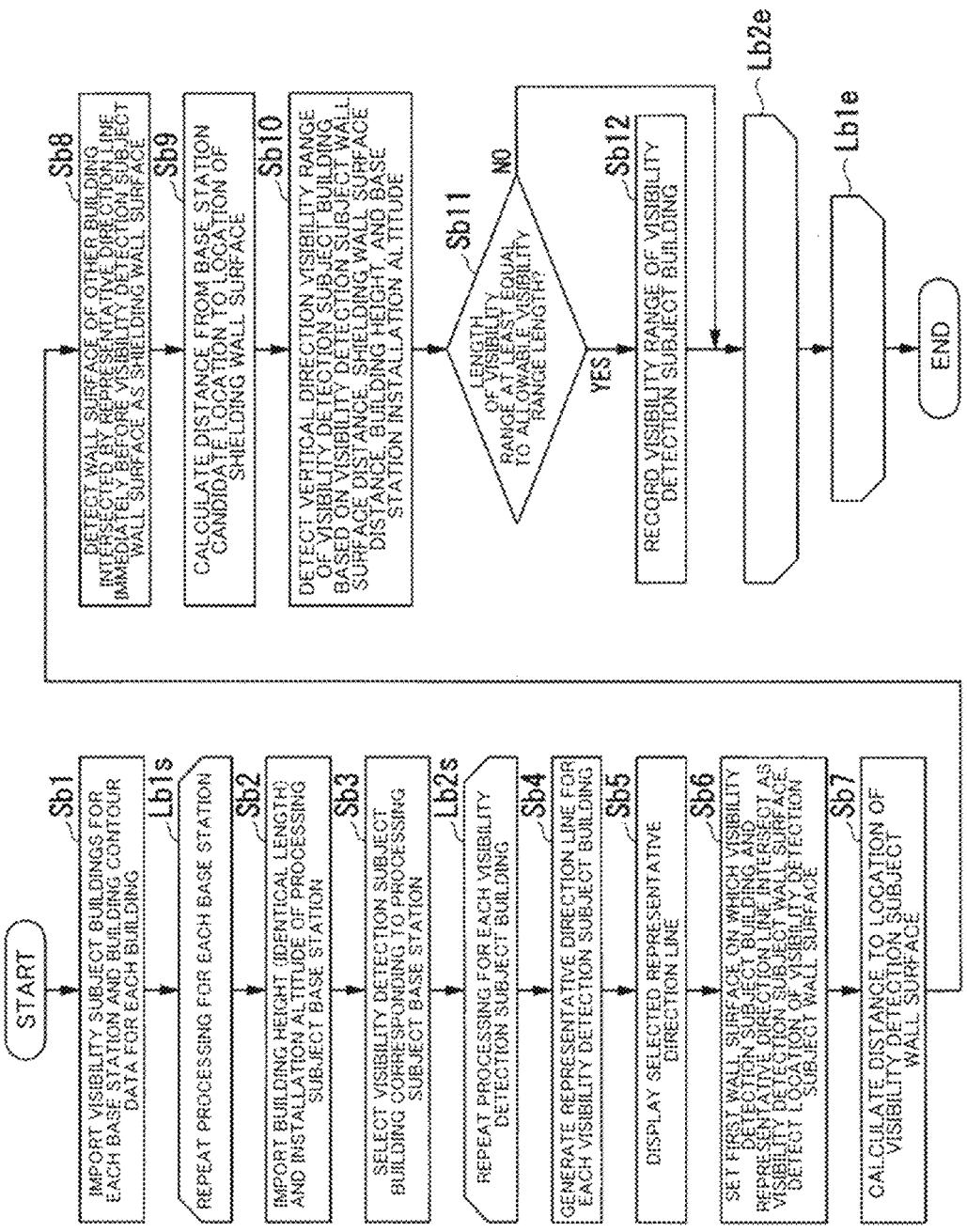
FIG. 9 is a flowchart showing a flow of processing performed by the vertical direction visibility detection processing unit according to the first embodiment.

Next, referring to FIGS. 9 to 11, the processing performed by the vertical direction visibility detection processing unit 21 will be described. FIG. 9 is a flowchart showing a flow of processing performed after the processing performed by the vertical direction visibility detection subject building selection unit 20, shown in FIG. 6, this processing corresponding to a part of the processing of step S4-4 in FIG. 2.

The representative direction line generation unit 212 imports all of the base station candidate location data and the building identification data indicating the visibility detection subject buildings associated respectively with the base station candidate location data, output by the vertical direction visibility detection subject building selection unit 20. The representative direction line generation unit 212 imports the building identification data of all of the buildings included in the design area and the building contour data respectively associated with the building identification data, output by the vertical direction visibility detection subject building selection unit 20 (step Sb1).

The representative direction line generation unit 212 selects one set of base station candidate location data from the base station candidate location data (loop Lb1s).

The visibility range detection unit 215 imports, from the outside, data indicating the installation altitude of the base station corresponding to the selected base station candidate location data and the data indicating the building English Translation of height of an identical length for all of the buildings (step Sb2). The representative direction line generation unit 212 selects the building identification data indicating all of the visibility detection subject buildings corresponding to the selected base station candidate location data and the building contour data associated respectively with the building identification data (step Sb3).

The representative direction line generation unit 212 selects one set of building identification data from the selected building identification data indicating the visibility detection subject buildings (loop Lb2s).

The representative direction line generation unit 212 calculates the location of the center of gravity of the building corresponding to the selected building identification data on the basis of the building contour data corresponding to the building identification data. The representative direction line generation unit 212 then generates a representative direction line, which is a straight line that originates from the location indicated by the selected base station candidate location data and is oriented in a direction that intersects the center of gravity of the visibility detection subject building corresponding to the selected building identification data (step Sb4). The representative direction line generation unit 212 displays the generated representative direction line on the map data within the range of the design area, which are displayed on a screen of the station installation support device 1, for example (step Sb5).

Figure 10:
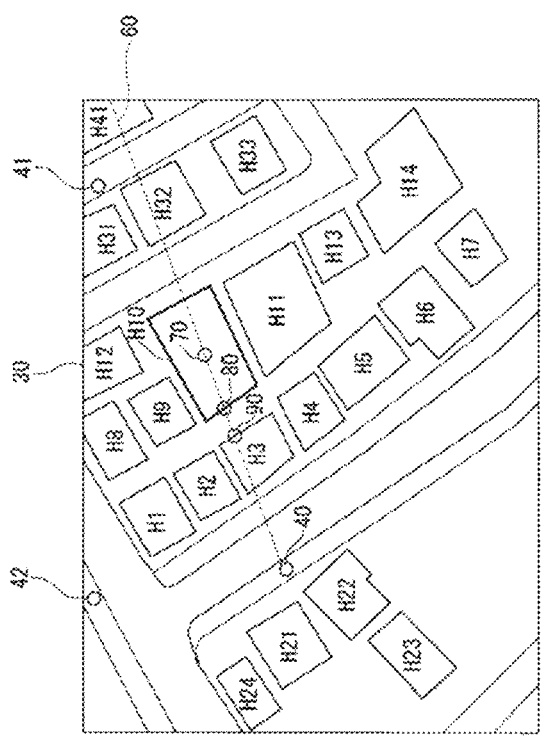
FIG. 10 is a view showing an outline of the processing performed by the vertical direction visibility detection processing unit according to the first embodiment.

Map data within the range of the design area shown in FIG. 10, for example, are displayed on the screen of the station installation support device 1, and it is assumed that the utility pole 40 is located in the location indicated by the base station candidate location data selected by the representative direction line generation unit 212. The visibility detection subject building selected by the representative direction line generation unit 212 is a building H10, and a location indicated by a reference numeral 70 is assumed to be the location of the center of gravity of the building H10. At this time, the representative direction line generation unit 212 generates a representative direction line 60 that originates from the location of the utility pole 40, or in other words the location indicated by the selected base station candidate location data, and intersects the center of gravity of the building H10, which is indicated by the reference numeral 70, and displays the generated representative direction line 60 on the screen.

The representative direction line generation unit 212 outputs the selected base station candidate location data, the building identification data of the selected visibility detection subject building, the building contour data corresponding to the building identification data, and data indicating the generated representative direction line to the visibility detection subject wall surface detection unit 213. Here, the data indicating the representative direction line are data including the coordinates of a start point and the coordinates of an end point of the representative direction line, for example.

Further, the representative direction line generation unit 212 outputs the selected base station candidate location data, the building identification data of the selected visibility detection subject building, the imported building identification data of all of the buildings included in the design area and the building contour data respectively associated with the building identification data, and the data indicating the generated representative direction line to the shielding wall surface detection unit 214.

The visibility detection subject wall surface detection unit 213 imports the base station candidate location data, the building identification data of the visibility detection subject building, the building contour data corresponding to the building identification data, and the data indicating the generated representative direction line, output by the representative direction line generation unit 212.

On the basis of the data indicating the representative direction line and the building contour data of the visibility detection subject building, the visibility detection subject wall surface detection unit 213 detects the location that is closest to the location indicated by the imported base station candidate location data, among the locations where the contour of the visibility detection subject building and the representative direction line intersect (step Sb6). For example, when the building H10 shown in FIG. 10 is the visibility detection subject building, the visibility detection subject wall surface detection unit 213 detects an intersection 80, which is an intersection where the representative direction line 60 corresponding to the visibility detection subject building intersects the contour of the building H10 and the intersection that is closest to the location of the utility pole 40. The detected location of the intersection 80 serves as the location of the visibility detection subject wall surface of the visibility detection subject building.

The visibility detection subject wall surface detection unit 213 calculates the distance on a horizontal plane between the detected location of the visibility detection subject wall surface and the location indicated by the base station candidate location data (this distance will be referred to hereafter as the visibility detection subject wall surface distance) (step Sb7). When the building H10 shown in FIG. 10 is the visibility detection subject building, the visibility detection subject wall surface detection unit 213 calculates the distance between the location indicated by the base station candidate location data corresponding to the utility pole 40 and the intersection 80 as the visibility detection subject wall surface distance.

The visibility detection subject wall surface detection unit 213 outputs the base station candidate location data, the building identification data of the visibility detection subject building, and data indicating the calculated visibility detection subject wall surface distance to the visibility range detection unit 215.

The shielding wall surface detection unit 214 imports the base station candidate location data, the building identification data of the visibility detection subject building, the building identification data of all of the buildings included in the design area and the building contour data respectively associated with the building identification data, and the data indicating the generated representative direction line, output by the representative direction line generation unit 212.

On the basis of the data indicating the representative direction line, the building identification data of the visibility detection subject building, and the building identification data of all of the buildings included in the design area and the building contour data respectively associated with the building identification data, the shielding wall surface detection unit 214 detects the building wall surfaces that intersect the representative direction line in order from the wall surface closest to the location indicated by the base station candidate location data. The English Translation of shielding wall surface detection unit 214 detects the location where the building wall surface detected immediately before the visibility detection subject wall surface intersects the representative direction line as the location of the shielding wall surface (step Sb8).

When the building H10 shown in FIG. 10 is the visibility detection subject building, the shielding wall surface detection unit 214 detects intersections between the representative direction line 60 corresponding to the visibility detection subject building and the contours of a building H3, the building H10, a building H32, and a building H41, which exist on the representative direction line 60, in order from the intersection closest to the location of the utility pole 40. When the shielding wall surface detection unit 214 detects the intersection 80 where the representative direction line 60 first intersects the contour of the building H10 serving as the visibility detection subject building, or in other words detects the intersection with the visibility detection subject wall surface, the shielding wall surface detection unit 214 detects the location of an intersection 90 with the building H3, which is the intersection immediately before the detected intersection 80, as the location of the shielding wall surface.

The shielding wall surface detection unit 214 calculates the distance on a horizontal plane between the detected location of the shielding wall surface and the location indicated by the base station candidate location data (this distance will be referred to hereafter as the shielding wall surface distance) (step Sb9). When the building H10 shown in FIG. 10 is the visibility detection subject building, the shielding wall surface detection unit 214 calculates the distance between the location indicated by the base station candidate location data corresponding to the utility pole 40 and the intersection 90 as the shielding wall surface distance.

The shielding wall surface detection unit 214 outputs the base station candidate location data and data indicating the calculated shielding wall surface distance to the visibility range detection unit 215.

The visibility range detection unit 215 imports the base station candidate location data, the building identification data of the visibility detection subject building, and the data indicating the calculated visibility detection subject wall surface distance, output by the visibility detection subject wall surface detection unit 213. The visibility range detection unit 215 also imports the base station candidate location data and the data indicating the calculated shielding wall surface distance, output by the shielding wall surface detection unit 214.

The visibility range detection unit 215 detects the visibility range of the visibility detection subject wall surface of the visibility detection subject building on the basis of the installation altitude of the base station device and the building height, imported in step Sb2, the visibility detection subject wall surface distance, and the shielding wall surface distance (step Sb10).

Figure 11:
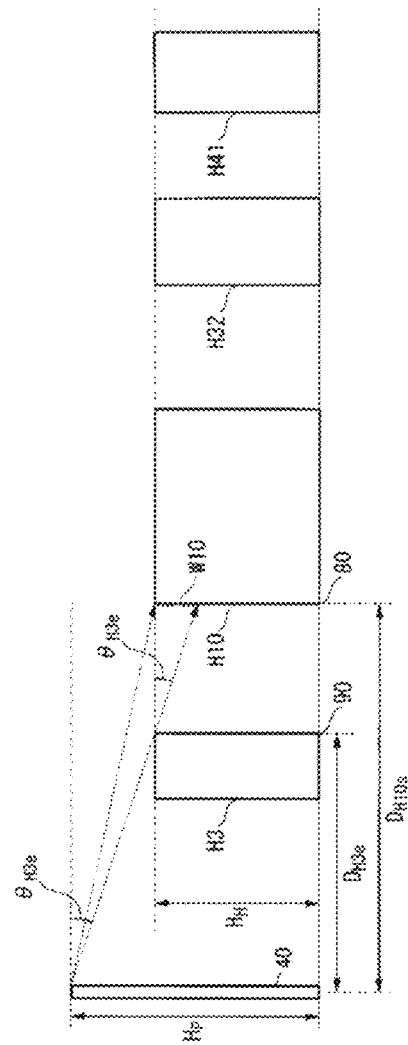
FIG. 11 is a view showing a method used by the vertical direction visibility detection processing unit according to the first embodiment to calculate a vertical direction visibility range.

FIG. 11 is a vertical sectional view of the representative direction line 60 shown in FIG. 10, illustrating a case in which the installation altitude is applied to the utility pole 40 located on the representative direction line 60 and the building height of an identical length is applied to the buildings H3, H10, H32, and H41. In FIG. 11, the installation altitude imported by the visibility range detection unit 215 in step Sb2 is shown as "Hp", and the building height is shown as "$H_H$".

In FIG. 11, the visibility detection subject wall surface distance calculated by the visibility detection subject wall surface detection unit 213 in relation to the representative direction line 60, or in other words the distance from the utility pole 40 to the intersection 80 on the building H10, is shown as "$D_{H10s}$". Further, the shielding wall surface distance calculated by the shielding wall surface detection unit 214 in relation to the representative direction line 60, or in other words the distance from the utility pole 40 to the intersection 90 on the building H3, is shown as "$D_{H3e}$".

At this time, the visibility range detection unit 215 calculates the length of a part indicated by the reference symbol W10 (referred to hereafter as a visibility range W10), which is the visibility range of the building H10 from the location of the installation altitude of the utility pole 40. The visibility range detection unit 215 calculates the length of the visibility range W10 using formula (1) shown below, for example.

[Formula 1]

$$W10=(D_{H10s}-D_{H3e})\cdot \tan \theta_{H3e} \quad (1)$$

In formula (1), $\theta_{H3e}$ is an angle determined using formula (2) shown below.

[Formula 2]

$$\theta_{H3e} = \tan^{-1}\left(\frac{H_p - H_H}{D_{H3e}}\right) \quad (2)$$

Having calculated the length of the visibility range, the visibility range detection unit 215 determines whether or not the length of the visibility range equals or exceeds a predetermined allowable visibility range length (step Sb11). Here, the length of an antenna size of a wireless device installed on a wall surface of a building as the terminal station, for example, is applied as the allowable visibility range length. More specifically, a length of approximately "10 cm" is applied.

After determining that the length of the visibility range equals or exceeds the predetermined allowable visibility range length (step Sb11, Yes), the visibility range detection unit 215 writes the processing subject base station candidate location data, the building identification data of the visibility detection subject building, the location of the visibility detection subject wall surface of the visibility detection subject building, and the calculated length of the visibility range of the visibility detection subject building associatively to the data storage unit 15 so that the data are stored therein (step Sb12).

After the visibility range detection unit 213 determines that the length of the visibility range does not equal or exceed the predetermined allowable visibility range length (step Sb11, No), or after the processing of step Sb12, the representative direction line generation unit 212 selects building identification data indicating a visibility detection subject building for which the processing of step Sb4 onward has not yet been performed, among the visibility detection subject buildings, corresponding to the processing subject base station candidate location data, and performs the processing of step Sb4 onward thereon (loop Lb2e).

Having selected the building identification data indicating all of the visibility detection subject buildings corresponding to the processing subject base station candidate location data, the representative direction line generation unit 212 selects base station candidate location data for which the processing of step Sb2 onward has not yet been performed and performs the processing of step Sb2 onward thereon loop Lb1e).

When the vertical direction visibility detection processing unit 21 has detected vertical direction visibility ranges for all of the base stations, the following data are stored in the data storage unit 15. The data stored in the data storage unit 15 are the building identification data of the visibility detection subject buildings having a visibility range of a length that equals or exceeds the allowable visibility range length, the locations of the visibility detection subject wall surfaces of these visibility detection subject buildings, and the calculated lengths of the visibility ranges of the visibility detection subject buildings for the base station candidate location data corresponding to all of the base stations included within the range of the design area.

In the configuration of the first embodiment, described above, the vertical direction visibility detection subject building selection unit 20 sets the locations of base station installation structures, such as the utility poles 40, 41, . . . , that serve as candidates for installing base stations as base station candidate locations on the two-dimensional map data showing the buildings that serve as candidates for installing terminal stations. The vertical direction visibility detection subject building selection unit 20 then selects buildings that have other buildings between themselves and the location indicated by the base station candidate location data as visibility detection subject buildings for each set of data indicating the location of a base station candidate, or in other words for each set of base station candidate location data. The vertical direction visibility detection processing unit 21 sets the height of the buildings at an equal length, sets a position that is higher than the buildings as the installation altitude of the base station device, and detects, for each of the visibility detection subject buildings selected by the vertical direction visibility detection subject building selection unit 20, the visibility range of the visibility detection subject building from the installation attitude of the base station in the location indicated by the base station candidate location data. On the basis of the visibility ranges detected by the vertical direction visibility detection processing unit 21, the point cloud data processing unit 18 narrows down the three-dimensional point cloud data acquired by photographing the region including the base station installation structures and the buildings, and then uses the narrowed-down point cloud data to determine the visibility of the buildings from the location indicated by the base station candidate location data.

Thus, by applying the base station installation attitude and the building height likewise to buildings that are shielded in the horizontal direction by other buildings and therefore not subjected to visibility range detection by the horizontal direction visibility detection processing unit 14, the vertical direction visibility range thereof can be detected. As noted above, in order to detect the vertical direction visibility range accurately, information indicating the height above sea level at which the base stations are installed and the height above sea level of the buildings is required. In actuality, however, it is difficult to acquire accurate data about the height of the base stations and the buildings, and even when it is possible to acquire actual height data, the amount of data increases, leading to an increase in the calculation amount. In the configuration of the first embodiment, however, the heights of all of the buildings are set at an identical length, and in so doing, the increase in the amount of data can be suppressed to a fixed amount, with the result that the increase in the calculation amount can also be held at a fixed amount. Furthermore, with the configuration of the first embodiment, buildings that are likely to be visible in the vertical direction can be detected even when the actual terrain elevation and the actual heights of individual buildings are unclear.

Hence, according to the configuration of the first embodiment, horizontal direction and vertical direction visibility ranges can be detected using two-dimensional map data before performing the large-scale processing for determining visibility between a base station and a terminal station using large-volume three-dimensional point cloud data information. By setting the heights of all of the buildings at an identical length during detection of the vertical direction visibility range, it is possible to detect an approximate visibility range in the vertical direction without greatly increasing the calculation amount. Hence, with the configuration of the first embodiment, it is possible to narrow down candidate buildings for installing terminal stations on a two-dimensional map, and as a result, the amount of determination processing using three-dimensional point cloud data information can be greatly reduced.

Note that in the first embodiment, described above, the predetermined position on the visibility detection subject building is set as the center of gravity of the visibility detection subject building, but the predetermined position is not limited to the center of gravity of the visibility detection subject building and may also be the location of the center of the wall surface that is closest to the base station, among the wall surfaces of the visibility detection subject building, and so on, for example.

Further, in the first embodiment, the vertical direction visibility detection subject building selection unit 20 sets buildings other than the buildings that are visible in the horizontal direction, detected by the horizontal direction visibility detection processing unit 14, as the visibility detection subject buildings, but the configuration of the present invention is not limited to this embodiment. For example, buildings other than buildings facing parts of the range of the road 31*a* that are visible from the utility pole 40 may be detected as building visibility detection subject buildings that have other buildings between themselves and the locations indicated by the base station candidate location data.

Second Embodiment

Figure 12:
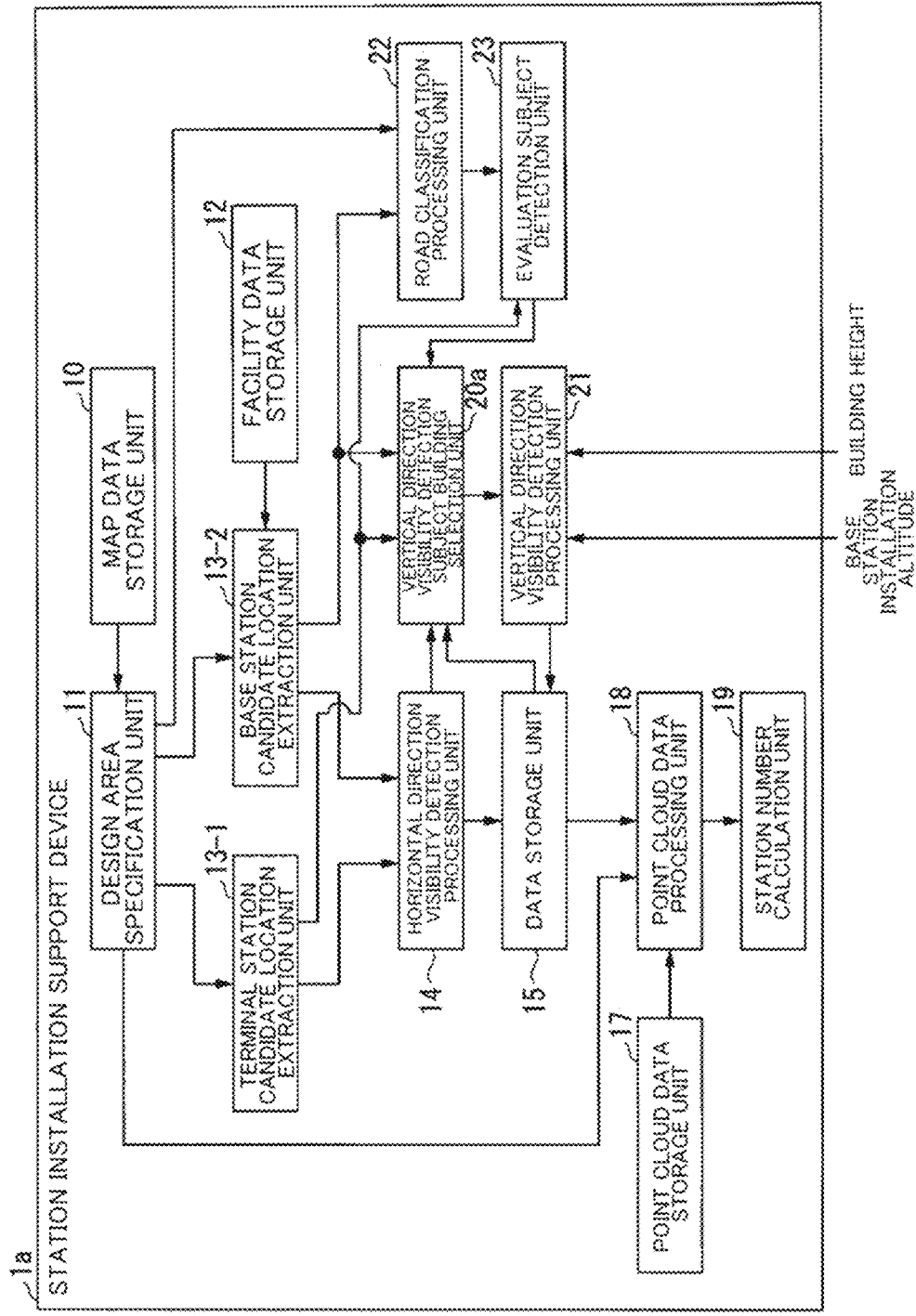
FIG. 12 is a block diagram showing a configuration of a station installation support device according to a second embodiment.

FIG. 12 is a block diagram showing a configuration of a station installation support device 1*a* according to a second embodiment. In the second embodiment, identical configurations to the first embodiment have been allocated identical reference symbols, and only different configurations will be described below.

The station installation support device 1*a* includes the map data storage unit 10, the design area specification unit 11, the equipment data storage unit 12, the terminal station candidate location extraction unit 13-1, the base station candidate location extraction unit 13-2, the horizontal direction visibility detection processing unit 14, the data storage unit 15, the point cloud data storage unit 17, the point cloud data processing unit 18, the station number calculation unit 19, a vertical direction visibility detection subject building selection unit 20*a*, the vertical direction visibility detection processing unit 21, a road classification processing unit 22, and an evaluation subject detection unit 23.

The road classification processing unit 22 detects the roads within the design area from the map data of the design area. The road classification processing unit 22 classifies the detected roads as either an evaluation reference road that serves as a reference for determining a visibility evaluation subject range or an evaluation boundary road for determining a boundary of the visibility evaluation subject range in relation to each set of base station candidate location data.

The road classification processing unit 22 detects data indicating the range of the roads as road range data. Note that when a sidewalk exists along a road, the sidewalk region is assumed to be included in the road range data. When the detected road includes an intersection, the road classification processing unit 22 divides the roads connected to the intersection in the center of the intersection, for example. When roads are divided, the road classification processing unit 22 detects the road range data of the divided roads individually. Note that in the case of a curved road such as an intersection, it may be the case that by following the same curved road on the front side (the south side) of a certain group of buildings, for example, one comes to the rear side (the north side) of the same group of buildings. In the case of a curved road of this type, the road classification processing unit 22 may divide the curved road to be evaluated from the end of the curved road to a location where the same curved road is visible (not physically since the curved road is not detached) and evaluate the divided interval of the curved road. Further, when a straight road is too long to evaluate the visibility of the buildings thereon, the buildings may be divided into groups of several tens of buildings (100 m intervals, for example).

The road classification processing unit 22 classifies the roads corresponding respectively to the road range data as the evaluation reference road, evaluation boundary roads, and other roads in relation to each set of base station candidate location data. Here, the evaluation reference road is a road to which the location indicated by the base station candidate location data belongs when a certain single set of the base station candidate location data is selected as the processing subject. Here, when the location indicated by the base station candidate location data belongs to the road, this means that, for example, the location indicated by the base station candidate location data is included in the region indicated by the road range data.

The evaluation boundary roads are roads to which the locations indicated by the base station candidate location data other than the base station candidate location data selected as the processing subject belong. The other roads are roads that do not correspond to either an evaluation reference road or an evaluation boundary road, i.e., roads to which none of the locations indicated by the base station candidate location data within the design area belong.

The evaluation subject detection unit 23 detects an evaluation subject set, which is a set of buildings included in the visibility evaluation subject range, for each set of base station candidate location data on the basis of the evaluation reference road and the evaluation boundary roads corresponding to the base station candidate location data. For example, the evaluation subject detection unit 23 detects the buildings facing the evaluation reference road corresponding to the base station candidate location data and adds the detected buildings to the evaluation subject set for each set of base station candidate location data. Further, every time a new building is added to the evaluation subject set, the evaluation subject detection unit 23 generates an addition candidate set, which is a set of buildings that are adjacent to the added building.

The evaluation subject detection unit 23 adds all of the buildings not facing the evaluation boundary roads corresponding to the base station candidate location data, among the buildings included in the generated addition candidate set, to the evaluation subject set repeatedly until one of the buildings included in the generated addition candidate set faces an evaluation boundary road corresponding to the base station candidate location data. Further, when one of the buildings included in the generated addition candidate set faces an evaluation boundary road corresponding to the base station candidate location data, the evaluation subject detection unit 23 sets the buildings included in the evaluation subject set as evaluation subject buildings and outputs the building identification data of the evaluation subject buildings to the vertical direction visibility detection subject building selection unit 20a in association with the base station candidate location data.

The vertical direction visibility detection subject building selection unit 20a imports the building identification data of the evaluation subject buildings associated with the base station candidate location data, output by the evaluation subject detection unit 23. Then, referring to the data storage unit 15, the vertical direction visibility detection subject building selection unit 20a detects the buildings for which a horizontal direction visibility range has not been detected by the horizontal direction visibility detection processing unit 14 among the evaluation subject buildings corresponding to the base station candidate location data as vertical direction visibility detection subject buildings.

Figure 13:
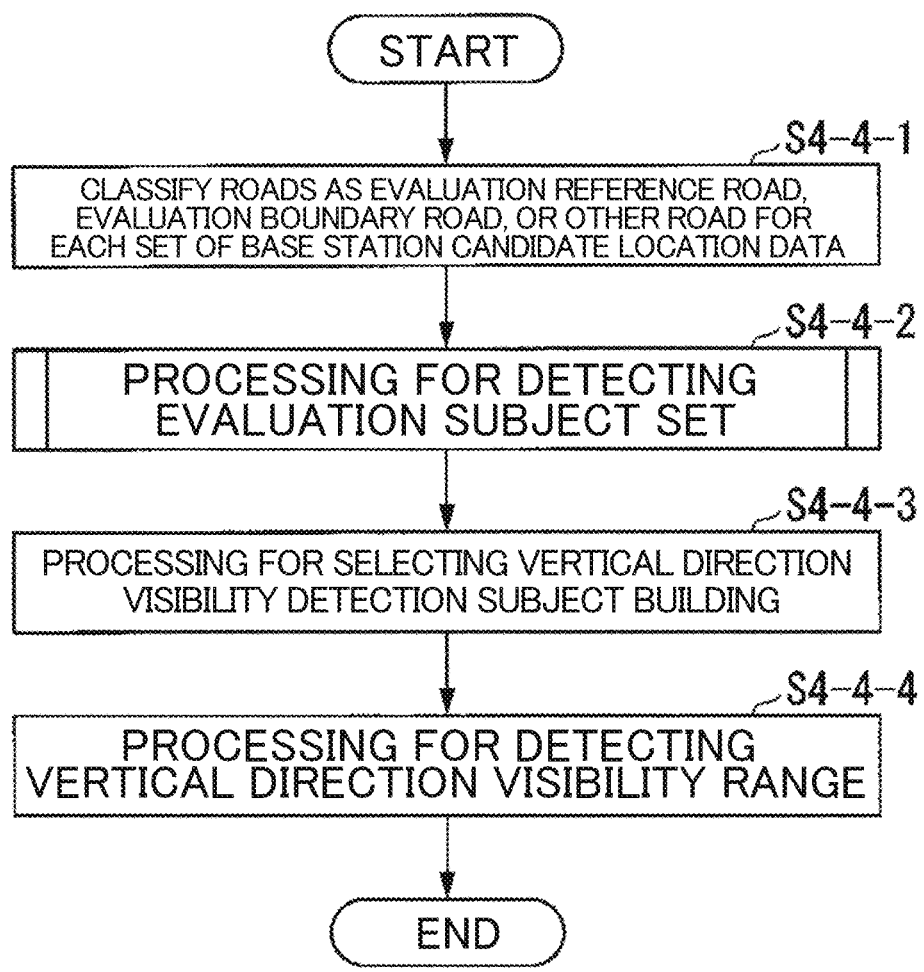
FIG. 13 is a flowchart showing a flow of processing performed by a road classification processing unit, an evaluation subject detection unit, a vertical direction visibility detection subject building selection unit, and a vertical direction visibility detection processing unit according to the second embodiment.

(Processing performed by station installation support device according to second embodiment) FIG. 13 is a flowchart showing processing corresponding to step S4-4 of FIG. 2 of the second embodiment. It is assumed that before the flowchart of FIG. 13 is executed, the processing performed by the horizontal direction visibility detection processing unit 14 in steps S4-1 and S4-2 of FIG. 2 is complete. In other words, it is assumed that data indicating the horizontal direction visibility range of each building is stored in the data storage unit 15 for the base station candidate location data corresponding to all of the base stations included within the range of the design area.

The road classification processing unit 22 classifies the roads as the evaluation reference road, the evaluation boundary roads, and the other roads for each set of base station candidate location data, and outputs the road range data of the evaluation reference road and the road range data of the evaluation boundary roads to the evaluation subject detection unit 23 (step S4-4-1).

Figure 15:
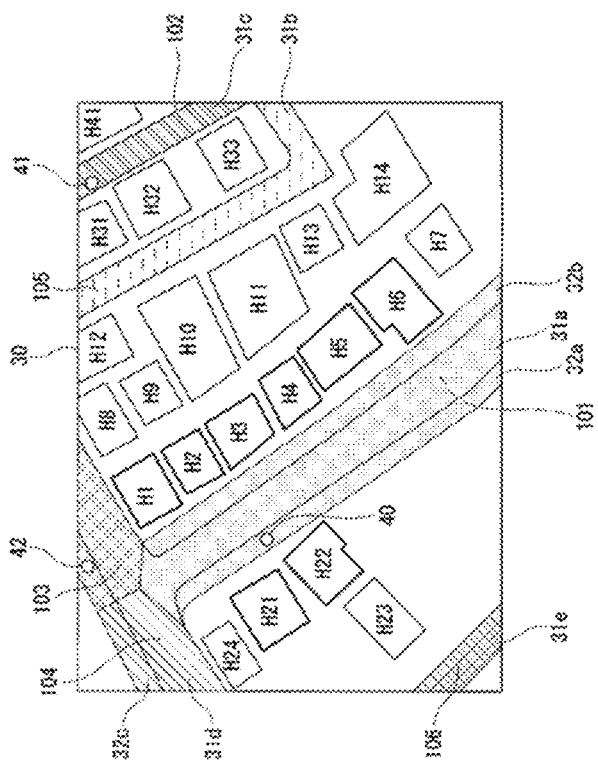
FIG. 15 is a view showing an outline (1) of the processing performed by the vertical direction visibility detection processing unit according to the second embodiment.

For example, in the case of the map data 30 shown in FIG. 15, the road classification processing unit 22 outputs road range data 101 including the location indicated by the base station candidate location data corresponding to the utility pole 40 as the road range data of the evaluation reference road of the utility pole 40. As shown in FIG. 15, the road range data 101 are data indicating the range of a region including the center of an intersection between the road 31a and the road 31d and including the road 31a and the sidewalks 32a and 32b.

Further, the road classification processing unit 22 outputs the following two sets of road range data as the road range data of the evaluation boundary roads of the utility pole 40. The road range data of a first evaluation boundary road are road range data 102 constituted by the region of the road 31c. The road range data 102 include the location indicated by the base station candidate location data corresponding to the utility pole 41, which differs from the utility pole 40.

The road range data of a second evaluation boundary road are road range data 103 constituted by a region including the center of the intersection between the road 31a and the road 31d and including the road 31d and the sidewalk 32c. The road range data 103 include the location indicated by the base station candidate location data corresponding to the utility pole 42, which differs from the utility pole 40.

In the case of the utility pole 41, the road classification processing unit 22 outputs the road range data 102 as the road range data of the evaluation reference road and outputs the road range data 101 and 103 as the road range data of the evaluation boundary roads.

In the case of the utility pole 42, the road classification processing unit 22 outputs the road range data 103 as the road range data of the evaluation reference road and outputs the road range data 101 and 102 as the road range data of the evaluation boundary roads.

Note that in the map data 30, utility poles do not exist in the region of road range data 105 corresponding to the road 31b and the region of road range data 106 corresponding to the road 31e. A utility pole also does not exist in the region of road range data 104 shown in FIG. 15. Accordingly, the road classification processing unit 22 classifies these roads as other roads not corresponding to either an evaluation reference road or an evaluation boundary road. Note that hereafter in the figures, from the viewpoint of facilitating viewing, width information will be omitted, regions indicated by the road range data of the evaluation reference road or the evaluation boundary roads will be represented by ranges defined by dot-dash line arrows, and regions indicated by the road range data of the other roads will be represented by ranges defined by solid line arrows.

Figure 14:
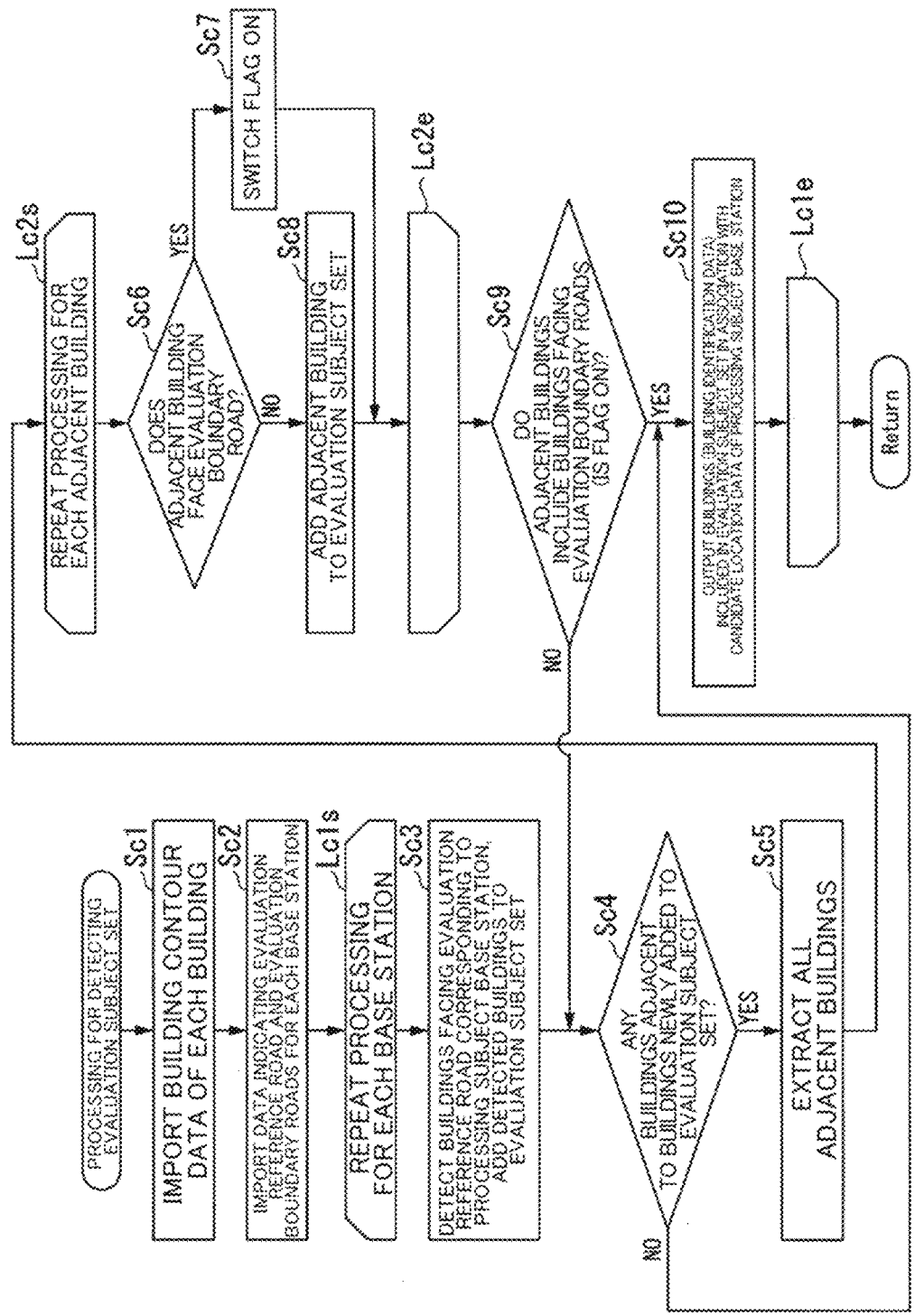
FIG. 14 is a flowchart showing a flow of the processing performed by the vertical direction visibility detection processing unit according to the second embodiment.

The evaluation subject detection unit 23 performs detection processing on the evaluation subject set in accordance with a flowchart shown in FIG. 14 (step S4-4-2).

The processing performed by the evaluation subject detection unit 23 in accordance with the flowchart of FIG. 14 will be described below with reference to FIGS. 15 to 17. The evaluation subject detection unit 23 imports the building identification data output by the terminal station candidate location extraction unit 13-1 and the building contour data associated with the building identification data (step Sc1).

The evaluation subject detection unit 23 imports the road range data of the evaluation reference road and the road range data of the evaluation boundary roads for each set of base station candidate location data, output by the road classification processing unit 22 (step Sc2).

The evaluation subject detection unit 23 selects one set of base station candidate location data from among the imported base station candidate location data (loop Lc1s). Here, it is assumed that the evaluation subject detection unit 23 selects the base station candidate location data corresponding to the utility pole 40.

The evaluation subject detection unit 23 initializes the evaluation subject set so as to create an empty set. The evaluation subject detection unit 23 detects the building identification data of the buildings facing the evaluation reference road on the basis of the road range data of the evaluation reference road and the building contour data corresponding to the selected base station candidate location data, and adds the detected building identification data to the evaluation subject set (step Sc3).

Here, when a certain building faces a certain road, it is assumed, for example, that a part of the contour of the certain building exists within a range of a predetermined fixed distance from the region indicated by the road range data corresponding to the certain road. Note that with respect to a state of facing or not facing a road, there is a range in which the site of each building is divided by owner. Therefore, facing or not facing a road can also be defined according to whether or not the site contacts the road to be evaluated. Alternatively, facing or not facing a road may be defined such that even when the site does not contact the road (the nearest point on the road that corresponds to the shortest distance on the map), the site is determined as facing a road when the building is visible (when there is no obstruction between the point on the road and the building) from the road and determined as not facing the road when the building is not visible (when an obstruction exists between the point and the building).

In the case of the map data 30 shown in FIG. 15, the buildings that face the region indicated by the road range data 101 of the evaluation reference road corresponding to the utility pole 40 are the buildings H1 to H6 and the buildings H21 and H22 indicated by thick lines. Note that the building H7 and the building H24 do not have contours within a fixed distance range from the region indicated by the road range data 101 and are therefore determined as not facing the road corresponding to the road range data 101.

Accordingly, the evaluation subject detection unit 23 adds the building identification data of the buildings H1 to H6 and the buildings H21 and H22 to the evaluation subject set.

The evaluation subject detection unit 23 determines whether or not buildings exist adjacent to the buildings newly added to the evaluation subject set on the basis of the building contour data corresponding to the building identification data (step Sc4). After determining that no buildings exist adjacent to the buildings newly added to the evaluation subject set (step Sc4, No), the evaluation subject detection unit 23 advances the processing to step Sc10.

After determining that buildings exist adjacent to the buildings newly added to the evaluation subject set (step Sc4, Yes), on the other hand, the evaluation subject detection unit 23 extracts all of the buildings that are adjacent to the buildings newly added to the evaluation subject set and generates a set of the building identification data of the extracted buildings as the addition candidate set (step Sc5). In the example shown in FIG. 15, the building identification data of the buildings H1 to H6 and the buildings H21 and H22 are included in the evaluation subject set in step Sc3. Among these buildings, buildings exist adjacent to the buildings H1 to H6 and the building H22, and therefore the evaluation subject detection unit 23 determines Yes in step Sc4.

Here, when a certain building A is adjacent to a different building B, this means that at least a predetermined, fixed proportion of the wall surface of the building A faces the wall surface of the building B within a range of a predetermined, fixed distance. As shown in FIG. 16, therefore, the buildings H7 to H11 and the buildings H13 and H14, which are newly indicated by thick lines, are respectively adjacent to the buildings H1 to H6, while the building H23 is adjacent to the building H22 and the building H24 is adjacent to the building H21. Note that a part of the wall surface of the building H12 faces a part of the wall surface of the building H1 through a gap between the building H8 and the building H9, but since the proportion of the opposing wall surface does not reach the predetermined, fixed proportion, the building H12 is not set as a building that is adjacent to the adjacent building H1.

In step Sc5, the evaluation subject detection unit 23 generates an addition candidate set including the building identification data of the buildings H7 to H11, the buildings H13 and H14, and the buildings H23 and H24.

The evaluation subject detection unit 23 then selects one set of building identification data from among the building identification data included in the generated addition candidate set (loop Lc2s). Note that when the evaluation subject detection unit 23 selects the first set of building identification data from the generated addition candidate set, the evaluation subject detection unit 23 generates a flag region in an internal storage area and initializes the generated flag by writing "OFF" thereto.

The evaluation subject detection unit 23 determines whether or not the building corresponding to the selected building identification data faces an evaluation boundary road on the basis of the road range data of the evaluation boundary roads and the building contour data corresponding to the selected building identification data (step Sc6). Having determined that the building corresponding to the selected building identification data faces an evaluation boundary road (step Sc6, Yes), the evaluation subject detection unit 23 writes "ON" to the flag (step Sc7). Having determined that the building corresponding to the selected building identification data does not face an evaluation boundary road (step Sc6, No), on the other hand, the evaluation subject detection unit 23 adds the selected building identification data to the evaluation subject set (step Sc8).

Following the processing of step Sc7 and step Sc8, the evaluation subject detection unit 23 selects a set of building identification data for which the processing of step Sc6 has not yet been performed from among the building identification data included in the generated addition candidate set and performs the processing of step Sc6 onward thereon (loop Lc2e).

Figure 16:
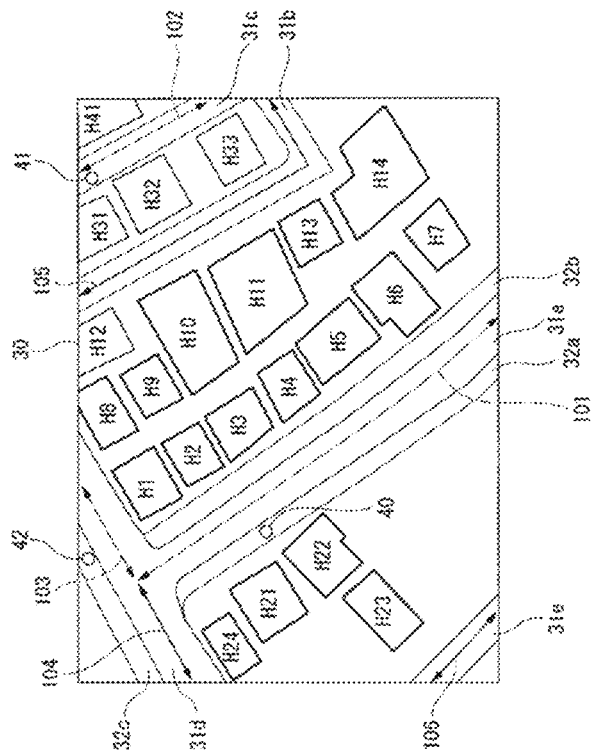
FIG. 16 is a view showing an outline (2) of the processing performed by the vertical direction visibility detection processing unit according to the second embodiment.

In the example shown in FIG. 16, the addition candidate set generated by the evaluation subject detection unit 23 in step Sc5 includes the building identification data of the buildings H7 to H11, the buildings H13 and H14, and the buildings H23 and H24. Of these buildings, only the building H8 faces the evaluation boundary road corresponding to the road range data 103. Hence, when the building identification data of the building H8 is selected, the evaluation subject detection unit 23 determines Yes in step Sc6 and writes "ON" to the flag in step Sc7.

When, on the other hand, the buildings other than the building H8, namely the building H7, the buildings H9 to H11, the buildings H13 and H14, and the buildings H23 and H24, are selected, the evaluation subject detection unit 23 determines No in step Sc6. Note that although the building H24 faces the road 31d, the road 31d is not an evaluation boundary road, and therefore the evaluation subject detection unit 23 determines No in step Sc6 likewise in relation to the building H24.

In step Sc8, the evaluation subject detection unit 23 adds the building identification data of the building H7, the buildings H9 to H11, the buildings H13 and H14, and the buildings H23 and H24 to the evaluation subject set. Having performed the processing of the loop Lc2s to Lc2e on all of the building identification data included in the generated addition candidate set, the evaluation subject detection unit 23 determines whether or not any of the buildings corresponding to the building identification data included in the generated addition candidate set faces an evaluation boundary road. In other words, the evaluation subject detection unit 23 determines whether or not the flag is "ON" (step Sc9).

Having determined that the flag is not "ON", or in other words that none of the buildings corresponding to the building identification data included in the generated addition candidate set faces an evaluation boundary road (step Sc9, No), the evaluation subject detection unit 23 performs the processing of step Sc4 onward in relation to the buildings newly added to the evaluation subject set.

Having determined, on the other hand, that the flag is "ON", or in other words that the buildings corresponding to the building identification data included in the generated addition candidate set include a building facing an evaluation boundary road (step Sc9, Yes), the evaluation subject detection unit 23 outputs the building identification data included in the evaluation subject set at that time to the vertical direction visibility detection subject building selection unit 20a in association with the processing subject base station candidate location data (step Sc10).

The evaluation subject detection unit 23 then selects a set of base station candidate location data for which the processing of step Sc3 onward has not yet been performed from among the base station candidate location data and performs the processing of step Sc3 onward thereon (loop Lc1e).

In the example shown in FIG. 16, the building H8 faces the evaluation boundary road corresponding to the road range data 103. Therefore, the evaluation subject detection unit 23 writes "ON" to the flag in step Sc7 and determines Yes in step Sc9. Accordingly, as shown in FIG. 17, the buildings included in the evaluation subject set corresponding to the base station candidate location data of the utility pole 40, which is output by the evaluation subject detection unit 23 in step Sc10, are the buildings H1 to H7, the buildings H9 to H11, the buildings H13 and H14, and the buildings H21H24.

Returning to FIG. 13, the vertical direction visibility detection subject building selection unit 20a performs processing for selecting a vertical direction visibility detection subject building (step S4-4-3). The vertical direction visibility detection subject building selection unit 20a imports the building identification data of the evaluation subject buildings, which are output successively by the evaluation subject detection unit 23 for each set of base station candidate location data. Having imported the building identification data of the evaluation subject buildings relating to all of the base station candidate location data, the vertical direction visibility detection subject building selection unit 20a performs processing in accordance with the flowchart shown in FIG. 6.

In step Sa3 of the flowchart of FIG. 6, the vertical direction visibility detection subject building selection unit 20a performs processing using the building identification data of the evaluation subject buildings corresponding to the processing subject base station candidate location data rather than all of the building identification data. More specifically, in step Sa3, the vertical direction visibility detection subject building selection unit 20a extracts, from the building identification data of the evaluation subject buildings, the building identification data of the buildings other than the buildings for which the horizontal direction visibility detection processing unit 14 has detected a horizontal direction visibility range, and sets the extracted building identification data as the building identification data indicating the vertical direction visibility detection subjects buildings.

Figure 17:
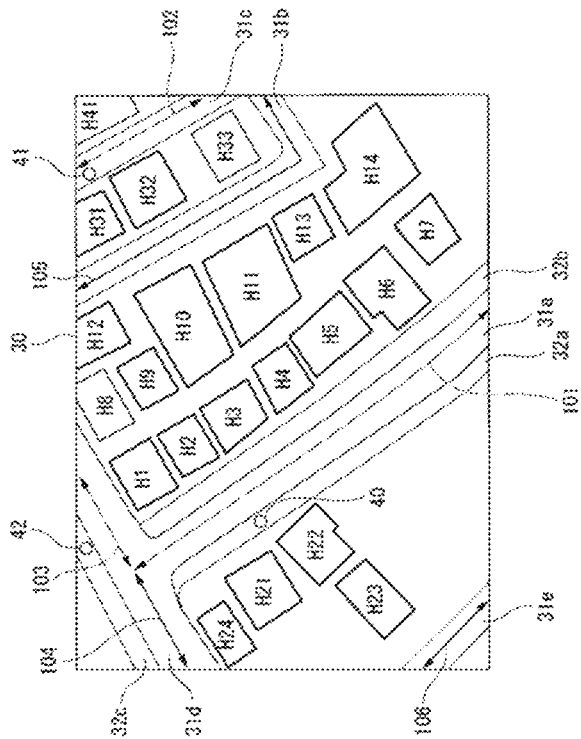
FIG. 17 is a view showing an outline (3) of the processing performed by the vertical direction visibility detection processing unit according to the second embodiment.

In the example shown in FIG. 17, the evaluation subject buildings corresponding to the utility pole 40 are the buildings H1 to H7, the buildings H9 to H11, the buildings H13 and H14, and the buildings H21H24. Accordingly, the vertical direction visibility detection subject building selection unit 20a sets the building H7, the buildings H9 to H11, the buildings H13 and H14, and the buildings H23 and H24, i.e., the buildings other than the buildings H1 to H6 and the buildings H21 and H22 that are visible in the horizontal direction, as the vertical direction visibility detection subject buildings corresponding to the utility pole 40.

When the processing performed by the vertical direction visibility detection subject building selection unit 20a is complete, the vertical direction visibility detection processing unit 21 performs the processing for detecting the vertical direction visibility range of the buildings, or in other words the processing shown on the flowchart of FIG. 9, for each set of base station candidate location data (step S4-4-4).

In the configuration of the second embodiment, described above, the road classification processing unit 22 divides the roads included in the two-dimensional map data by intersections and classifies the divided roads as either the evaluation reference road that serves as the reference for determining the visibility evaluation subject range or the evaluation boundary roads for determining the boundaries of the visibility evaluation subject range in relation to each set of base station candidate location data. The evaluation subject detection unit 23 detects the buildings facing the evaluation reference road corresponding to the base station candidate location data for each set of base station candidate location data, and adds the detected buildings to the evaluation subject set. Every time the evaluation subject detection unit 23 adds a new building to the evaluation subject set, the evaluation subject detection unit 23 generates an addition candidate set, which is a set of the buildings that are adjacent to the added building. The evaluation subject detection unit 23 adds all of the buildings not facing the evaluation boundary roads corresponding to the base station candidate location data, among the buildings included in the generated addition candidate set, to the evaluation subject set repeatedly until one of the buildings included in the generated addition candidate set faces an evaluation boundary road corresponding to the base station candidate location data.

Thus, in the configuration of the second embodiment, the evaluation subject detection unit 23 can narrow down the buildings included in the vertical direction visibility evaluation subject range on the basis of the evaluation reference road and the evaluation boundary roads before the vertical direction visibility detection subject building selection unit 20a selects a vertical direction visibility detection subject building. In other words, the buildings that face the evaluation boundary roads are considered highly likely to be visible in the horizontal direction from the base stations installed in the locations indicated by the base station candidate location data belonging to the evaluation boundary roads, and it is therefore unnecessary to go to the trouble of detecting the vertical direction visibility of these buildings from the evaluation reference road side.

Hence, there is no need for the vertical direction visibility detection subject building selection unit 20a to set all of the buildings included in the design area as subjects, as in the first embodiment. Accordingly, the number of buildings used as processing subjects by the vertical direction visibility detection processing unit 21 can also be narrowed down. As a result, the calculation amount of the processing for detecting the vertical direction visibility range can be reduced.

For example, in the first embodiment, the vertical direction visibility detection processing unit 21 must perform the vertical direction visibility range detection processing with respect to the utility pole 40 using fourteen buildings, namely the buildings H7 to H14, the buildings H23 and H24, the buildings H31 to H33, and the building H41, as subjects. In the second embodiment, on the other hand, the vertical direction visibility detection processing unit 21 only has to perform the vertical direction visibility range detection processing using eight buildings, namely the building H7, the buildings H9 to H11, the building H13, the building H14, and the buildings H23 and H24, as subjects, and as a result, the calculation amount can be reduced by six buildings.

Third Embodiment

Figure 18:
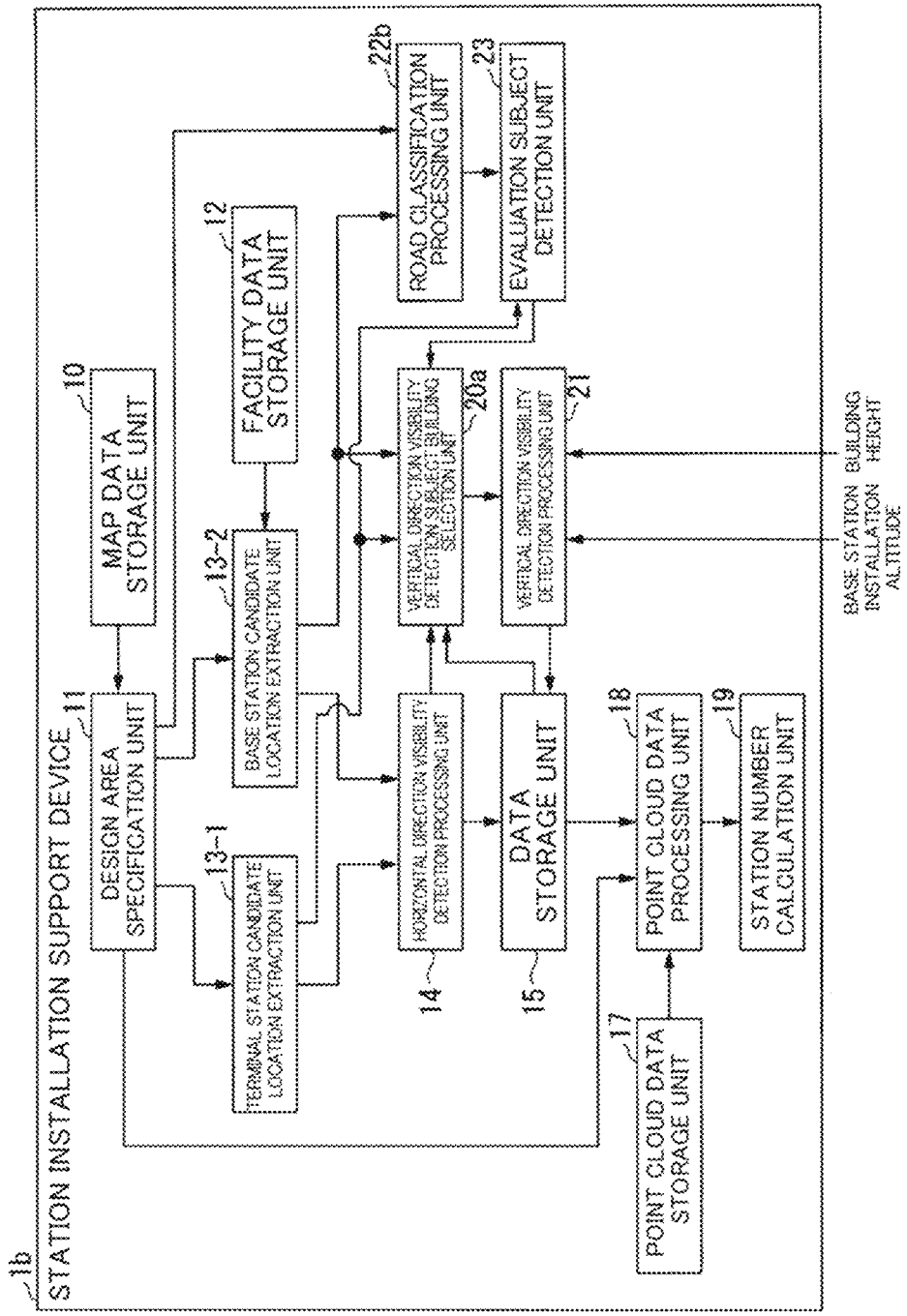
FIG. 18 is a block diagram showing a configuration of a station installation support device according to a third embodiment.

FIG. 18 is a block diagram showing a configuration of a station installation support device 1b according to a third embodiment. In the third embodiment, identical configurations to the first and second embodiments have been allocated identical reference symbols, and only different configurations will be described below.

The station installation support device 1b includes the map data storage unit 10, the design area specification unit 11, the equipment data storage unit 12, the terminal station candidate location extraction unit 13-1, the base station candidate location extraction unit 13-2, the horizontal direction visibility detection processing unit 14, the data storage unit 15, the point cloud data storage unit 17, the point cloud data processing unit 18, the station number calculation unit 19, the vertical direction visibility detection subject building selection unit 20a, the vertical direction visibility detection processing unit 21, a road classification processing unit 22b, and the evaluation subject detection unit 23.

The road classification processing unit 22b detects the roads within the design area from the map data of the design area. The road classification processing unit 22b classifies the detected roads as either the evaluation reference road that serves as the reference for determining the visibility evaluation subject range or the evaluation boundary road that serves as a boundary of the visibility evaluation subject range in relation to each set of base station candidate location data. In contrast to the road classification processing unit 22 of the second embodiment, the road classification processing unit 22b detects roads that are continuous within the design area from the map data of the design area as a single road.

Figure 19:
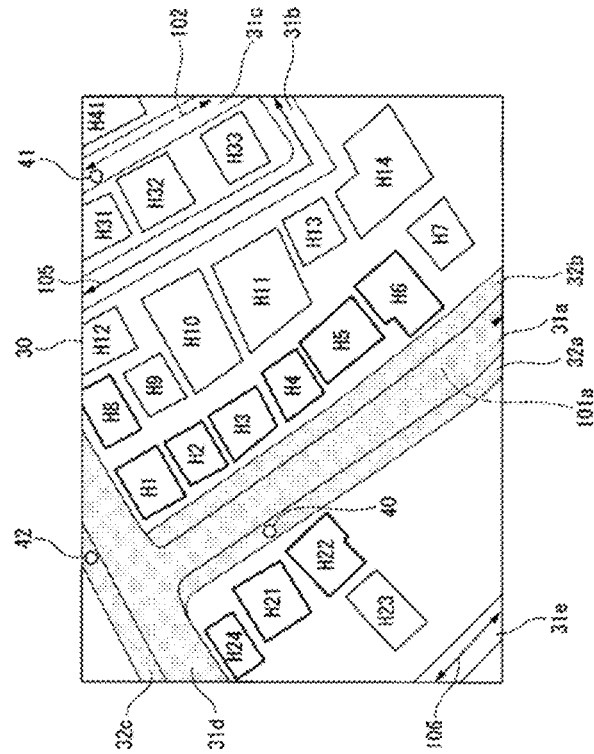
FIG. 19 is a view showing an outline (1) of processing performed by a vertical direction visibility detection processing unit according to the third embodiment.

For example, in the case of the map data 30 shown in FIG. 19, the road 31a and the road 31d are continuous, and therefore the road classification processing unit 22b detects these roads as a single road. The road classification processing unit 22b detects a region including the roads 31a and 31d, which are set as a single road, and the sidewalks 32a, 32b, and 32c serving as the sidewalks of the roads 31a and 31d as road range data 101a. Note that hereafter in the figures, from the viewpoint of facilitating viewing, width information relating to the road range data 101a will be omitted, and the road range data 101a will be represented by a range defined by dot-dash line arrows.

The road classification processing unit 22b classifies the roads corresponding to the road range data as the evaluation reference road, an evaluation boundary road, or other roads for each set of base station candidate location data. Note that the definitions of the evaluation reference road, the evaluation boundary road, and the other road are identical to the definitions described in the second embodiment.

(Processing Performed by Station Installation Support Device According to Third Embodiment)

The difference between the processing of the second embodiment and the processing of the third embodiment is the processing performed by the road classification processing unit 22b in step S4-4-1 of the flowchart shown in FIG. 13. In the remaining steps S4-4-2, S4-4-3, and S4-4-4, identical processing to that of the second embodiment is performed. Accordingly, the evaluation subject detection unit 23 of the station installation support device 1b performs processing in accordance with the flow shown on the flowchart of FIG. 14, similarly to the second embodiment.

In the third embodiment, in step S4-4-1 of the flowchart shown in FIG. 13, the road classification processing unit 22b outputs the road range data of the evaluation reference road and the road range data of the evaluation boundary road to the evaluation subject detection unit 23 for each set of base station candidate location data.

For example, in the case of the map data 30 shown in FIG. 19, the road classification processing unit 22b outputs the road range data 101a as road range data indicating the evaluation reference road of the utility pole 40 and the utility pole 42. Further, the road classification processing unit 22b outputs the road range data 102 as the road range data of the evaluation boundary road of the utility pole 40 and the utility pole 42.

In the case of the utility pole 41, the road classification processing unit 22b outputs the road range data 102 as the road range data of the evaluation reference road and outputs the road range data 101a as the road range data of the evaluation boundary road.

Note that in the map data 30, utility poles do not exist in the region of the road range data 105 of the road 31b and the region of the road range data 106 of the road 31e. Similarly to the second embodiment, therefore, the road classification processing unit 22b classifies these roads as other roads not corresponding to either an evaluation reference road or an evaluation boundary road.

A case in which the evaluation subject detection unit 23 selects the base station candidate location data of the utility pole 40 as the base station candidate location data in the loop Lc1s will be described below with reference to FIGS. 19 to 22. In steps Sc1 and Sc2, identical processing to the second embodiment is performed.

In the case of the map data 30 shown in FIG. 19, the buildings facing the region indicated by the road range data 101a of the evaluation reference road corresponding to the utility pole 40 are the buildings H1 to H6, the building H8, and the buildings H21, H22, and H24, which are indicated by thick lines. Accordingly, in step Sc3, the evaluation subject detection unit 23 adds the building identification data of the buildings H1 to H6, the building H8, and the buildings H21, H22, and H24 to the evaluation subject set.

Of the buildings included in the evaluation subject set, namely the buildings H1 to H6, the building H8, and the buildings H21, H22, and H24, buildings exist adjacent to the buildings H1 to H6, the building H8, and the building H22, and therefore the evaluation subject detection unit 23 determines Yes in step Sc4.

Figure 20:
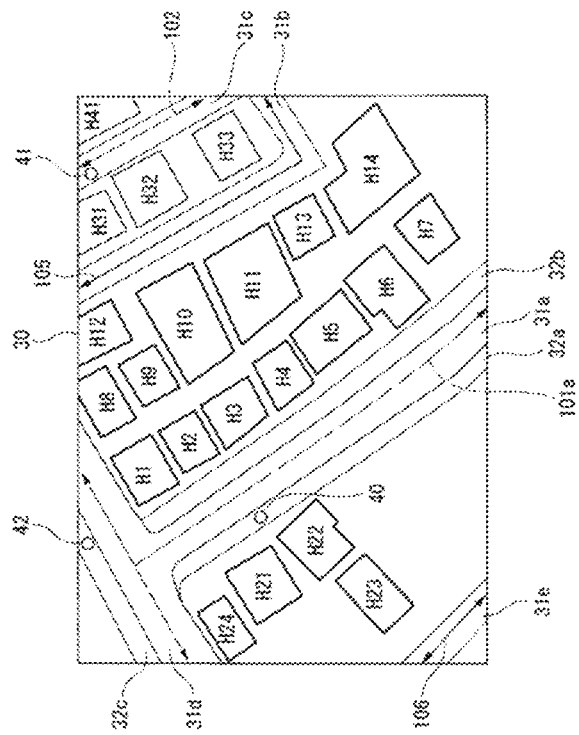
FIG. 20 is a view showing an outline (2) of the processing performed by the vertical direction visibility detection English Translation of processing unit according to the third embodiment.

The buildings H7 and the buildings H9 to H14, which are newly indicated by thick lines in FIG. 20, are adjacent to the buildings H1 to H6 and the building H8, while the building H23 is adjacent to the building H22. Hence, in step Sc5, the evaluation subject detection unit 23 generates an addition candidate set including the building identification data of the building H7, the buildings H9 to H14, and the building H23.

None of the building H7, the buildings H9 to H14, and the building H23 face the evaluation boundary road corresponding to the road range data 102, and therefore the evaluation subject detection unit 23 determines No in step Sc6 and adds the building identification data of the building H7, the buildings H9 to H14, and the building H23 to the evaluation subject set in step Sc8. Since the flag remains "OFF", the evaluation subject detection unit 23 determines No in step Sc9.

Of the building H7, the buildings H9 to H14, and the building H23 newly added to the evaluation subject set, buildings exist adjacent to the buildings H10 to H13, and therefore the evaluation subject detection unit 23 determines Yes in step Sc4.

Figure 21:
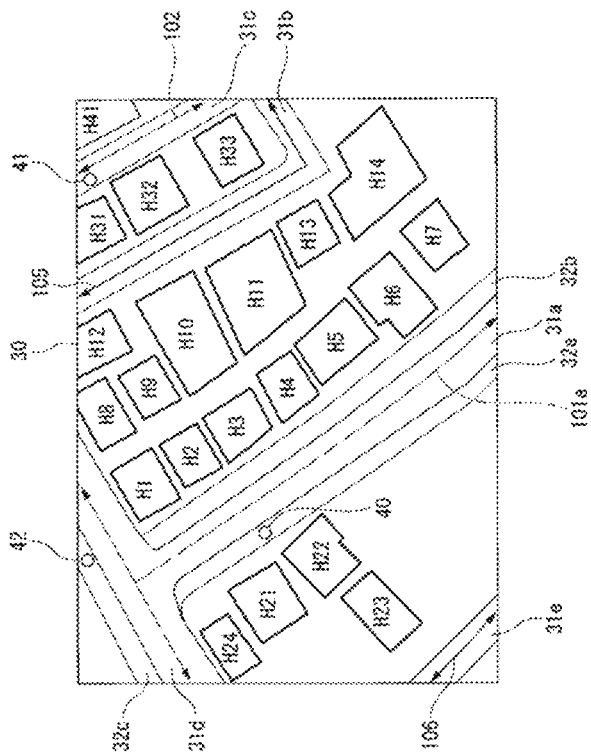

The buildings H31 to H33, which are newly indicated by thick lines in FIG. 21, are adjacent to the buildings H10 to H13. Hence, in step Sc5, the evaluation subject detection unit 23 generates an addition candidate set including the building identification data of the buildings H31 to H33.

All of the buildings H31 to H33 face the evaluation boundary road corresponding to the road range data 102, and therefore the evaluation subject detection unit 23 determines Yes in step Sc6 without adding the building identification data of the buildings H31 to H33 to the evaluation subject set, and writes "ON" to the flag in step Sc7.

Figure 22:
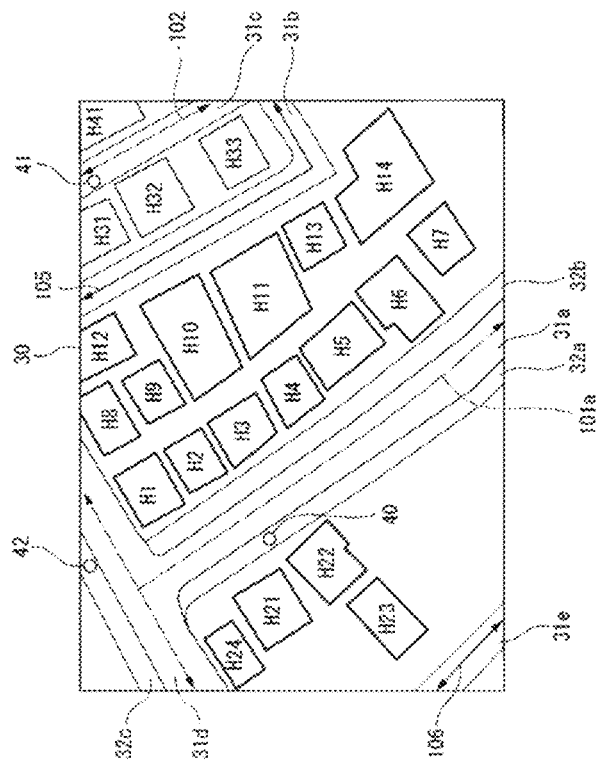
FIG. 22 is a view showing an outline (3) of the processing performed by the vertical direction visibility detection processing unit according to the third embodiment.

Since the flag is "ON", the evaluation subject detection unit 23 determines Yes in step Sc9. The evaluation subject detection unit 23 then outputs the building identification data included in the evaluation subject set to the vertical direction visibility detection subject building selection unit 20a in association with the base station candidate location data corresponding to the processing subject utility pole 40 in step Sc10. As shown in FIG. 22, in the case of the utility pole 40, the building identification data output by the evaluation subject detection unit 23 in step Sc10 are the building identification data of the buildings H1 to H14 and the buildings H21 to H24.

In the configuration of the third embodiment, described above, the road classification processing unit 22b regards continuous roads, among the roads included in the two-dimensional map data, as a single road and classifies the roads as either the evaluation reference road that serves as the reference for determining the visibility evaluation subject range or the evaluation boundary road for determining the boundary of the visibility evaluation subject range in relation to each set of base station candidate location data. The evaluation subject detection unit 23 detects the buildings facing the evaluation reference road corresponding to the base station candidate location data for each set of base station candidate location data, and adds the detected buildings to the evaluation subject set. Every time the evaluation subject detection unit 23 adds a new building to the evaluation subject set, the evaluation subject detection unit 23 generates an addition candidate set, which is a set of the buildings that are adjacent to the added building. The evaluation subject detection unit 23 adds all of the buildings not facing the evaluation boundary road corresponding to the base station candidate location data, among the buildings included in the generated addition candidate set, to the evaluation subject set repeatedly until one of the buildings included in the generated addition candidate set faces the evaluation boundary road corresponding to the base station candidate location data.

Thus, with the configuration of the third embodiment, similarly to the second embodiment, the evaluation subject detection unit 23 can narrow down the range of the buildings serving as vertical direction visibility detection evaluation subjects on the basis of the evaluation reference road and the evaluation boundary road before the vertical direction visibility detection subject building selection unit 20a selects a vertical direction visibility detection subject building.

Hence, there is no need for the vertical direction visibility detection subject building selection unit 20a to set all of the buildings included in the design area as subjects, as in the first embodiment. Accordingly, the number of buildings used as processing subjects by the vertical direction visibility detection processing unit 21 can also be narrowed down. As a result, the calculation amount of the processing for detecting the vertical direction visibility range can be reduced.

For example, in the first embodiment, the vertical direction visibility detection processing unit 21 must perform the vertical direction visibility range detection processing with respect to the utility pole 40 using fourteen buildings as subjects, as noted above. In the third embodiment, on the other hand, the vertical direction visibility detection processing unit 21 only has to perform the vertical direction visibility range detection processing using ten buildings, namely the buildings H7 to H14 and the buildings H23 and H24, as subjects, and as a result, the calculation amount can be reduced by four buildings.

Note that in the second and third embodiments described above, it is assumed that the building H7 does not face the road corresponding to the road range data 101, 101a and that the building H24 does not face the road corresponding to the road range data 101. However, the configuration of the present invention is not limited to these embodiments, and by changing the condition relating to the fixed distance range, it may be assumed that the building H7 faces the road corresponding to the road range data 101, 101a and that the building H24 faces the road corresponding to the road range data 101.

Fourth Embodiment

Figure 23:
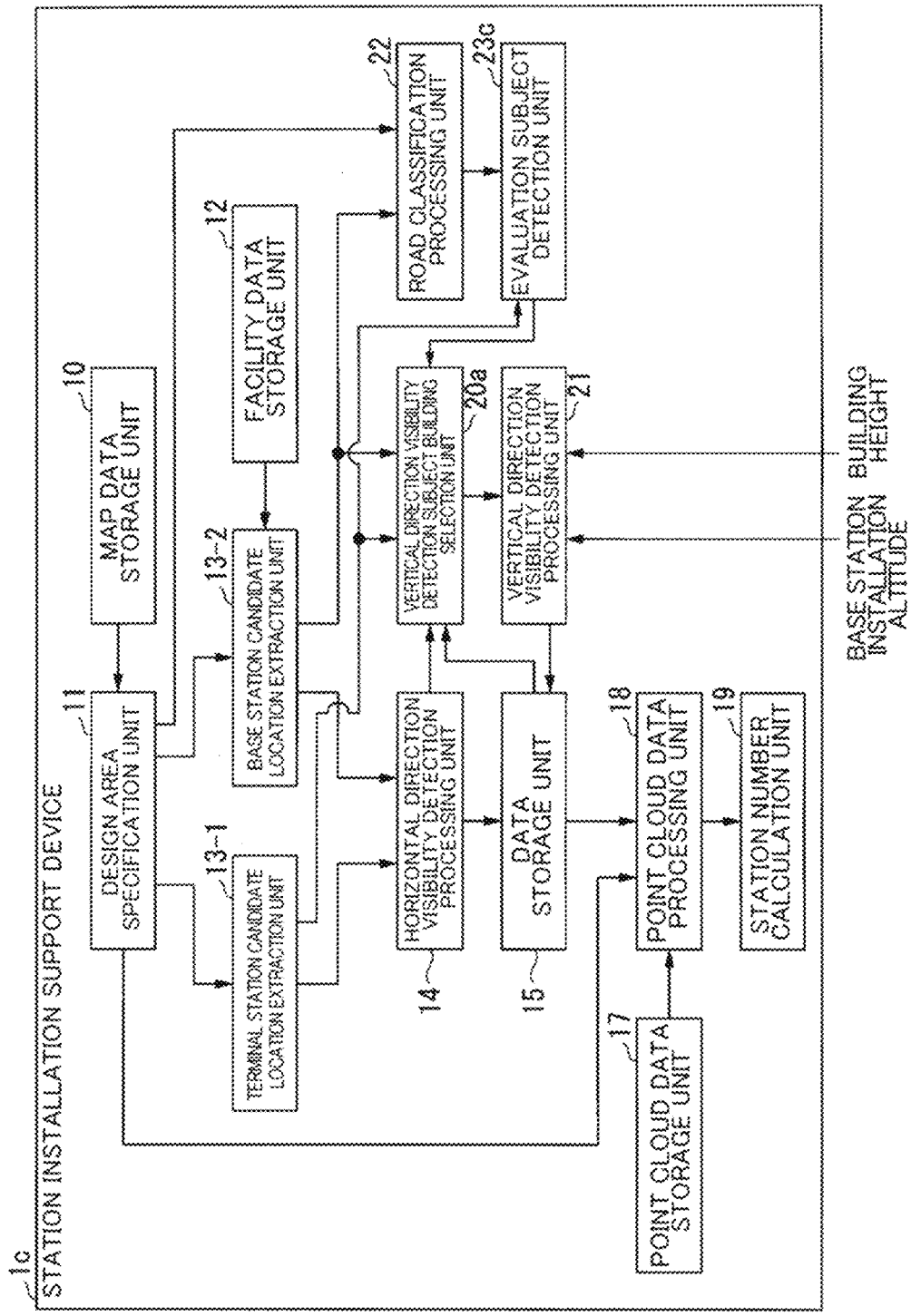
FIG. 23 is a block diagram showing a configuration of a station installation support device according to a fourth embodiment.

FIG. 23 is a block diagram showing a configuration of a station installation support device 1c according to a fourth embodiment. In the fourth embodiment, identical configurations to the first to third embodiments have been allocated identical reference symbols, and only different configurations will be described below.

The station installation support device 1c includes the map data storage unit 10, the design area specification unit 11, the equipment data storage unit 12, the terminal station candidate location extraction unit 13-1, the base station candidate location extraction unit 13-2, the horizontal direction visibility detection processing unit 14, the data storage unit 15, the point cloud data storage unit 17, the point cloud data processing unit 18, the station number calculation unit 19, the vertical direction visibility detection subject building selection unit 20a, the vertical direction visibility detection processing unit 21, the road classification processing unit 22, and an evaluation subject detection unit 23c.

Figure 25:
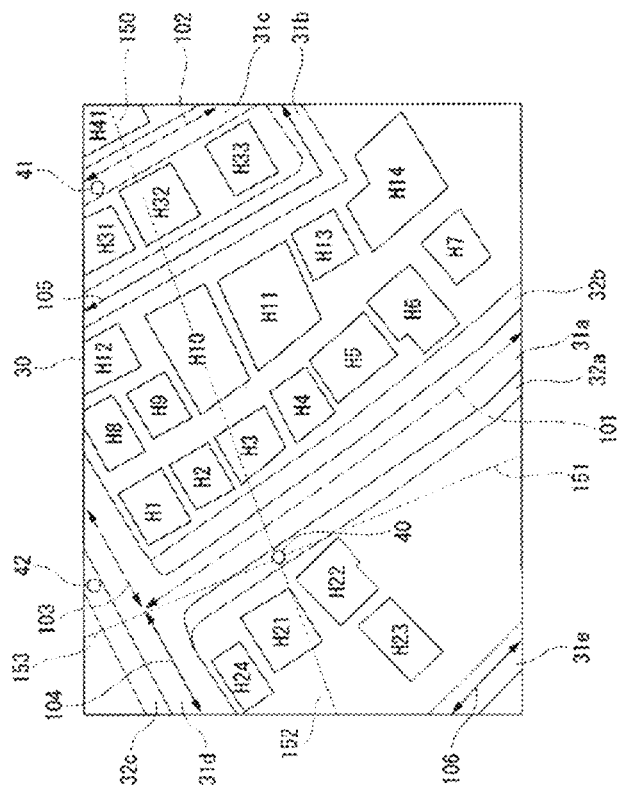
FIG. 25 is a view showing an outline (1) of the processing performed by the vertical direction visibility detection processing unit according to the fourth embodiment.

The evaluation subject detection unit 23c detects an evaluation subject set including the buildings included in the visibility evaluation subject range for each set of base station candidate location data on the basis of the evaluation reference road and the evaluation boundary roads corresponding to the base station candidate location data. For example, with respect to each set of base station candidate location data, the evaluation subject detection unit 23c sets the location indicated by the base station candidate location data as an origin and generates building detection lines extending in directions set as desired. An example shown in FIG. 25 illustrates a state in which the location indicated by the base station candidate location data is the location of the utility pole 40 and the evaluation subject detection unit 23c generates four building detection lines 150, 151, 152, 153.

It is envisaged here that approximately several tens of lines are generated by the evaluation subject detection unit 23c as the building detection lines. For example, it is assumed that the number of buildings existing in the design area is "200", the proportion of buildings facing roads on which utility poles are installed is "2/3", and the number of roads on which utility poles are installed is "5". In this case, the evaluation subject detection unit 23c generates 200×(1−2/3)÷5≈approximately 13 building detection lines. Accordingly, the evaluation subject detection unit 23c generates thirteen building detection lines at intervals of 360°÷13≈28°, for example. Note that the directions of the building detection lines are not limited to directions determined at fixed angular intervals and may be set as desired.

The evaluation subject detection unit 23c detects, for each building detection line 150, 151, . . . , the first building that intersects the building detection line 150, 151, . . . and faces the evaluation reference road corresponding to the base station candidate location data, and adds the detected building to the evaluation subject set. Then, every time the evaluation subject detection unit 23c adds a new building to the evaluation subject set, the evaluation subject detection unit 23c generates an addition candidate set, which is a set of the buildings that are adjacent to the added building.

The evaluation subject detection unit 23c adds all of the buildings not facing the evaluation boundary roads corresponding to the base station candidate location data, among the buildings included in the generated addition candidate set, to the evaluation subject set repeatedly until one of the buildings included in the generated addition candidate set faces an evaluation boundary road corresponding to the base station candidate location data. Further, when one of the buildings included in the generated addition candidate set faces an evaluation boundary road corresponding to the base station candidate location data, the evaluation subject detection unit 23c sets the buildings included in the evaluation subject set as evaluation subject buildings and outputs the building identification data of the evaluation subject buildings to the vertical direction visibility detection subject building selection unit 20a in association with the base station candidate location data.

(Processing Performed by Station Installation Support Device According to Fourth Embodiment)

The difference between the processing of the second embodiment and the processing of the fourth embodiment is the processing performed by the evaluation subject detection unit 23c in step S4-4-2 of the flowchart shown in FIG. 13. In the remaining steps S4-4-1, 34-4-3, and S4-4-4, identical processing to that of the second embodiment is performed.

Figure 24:
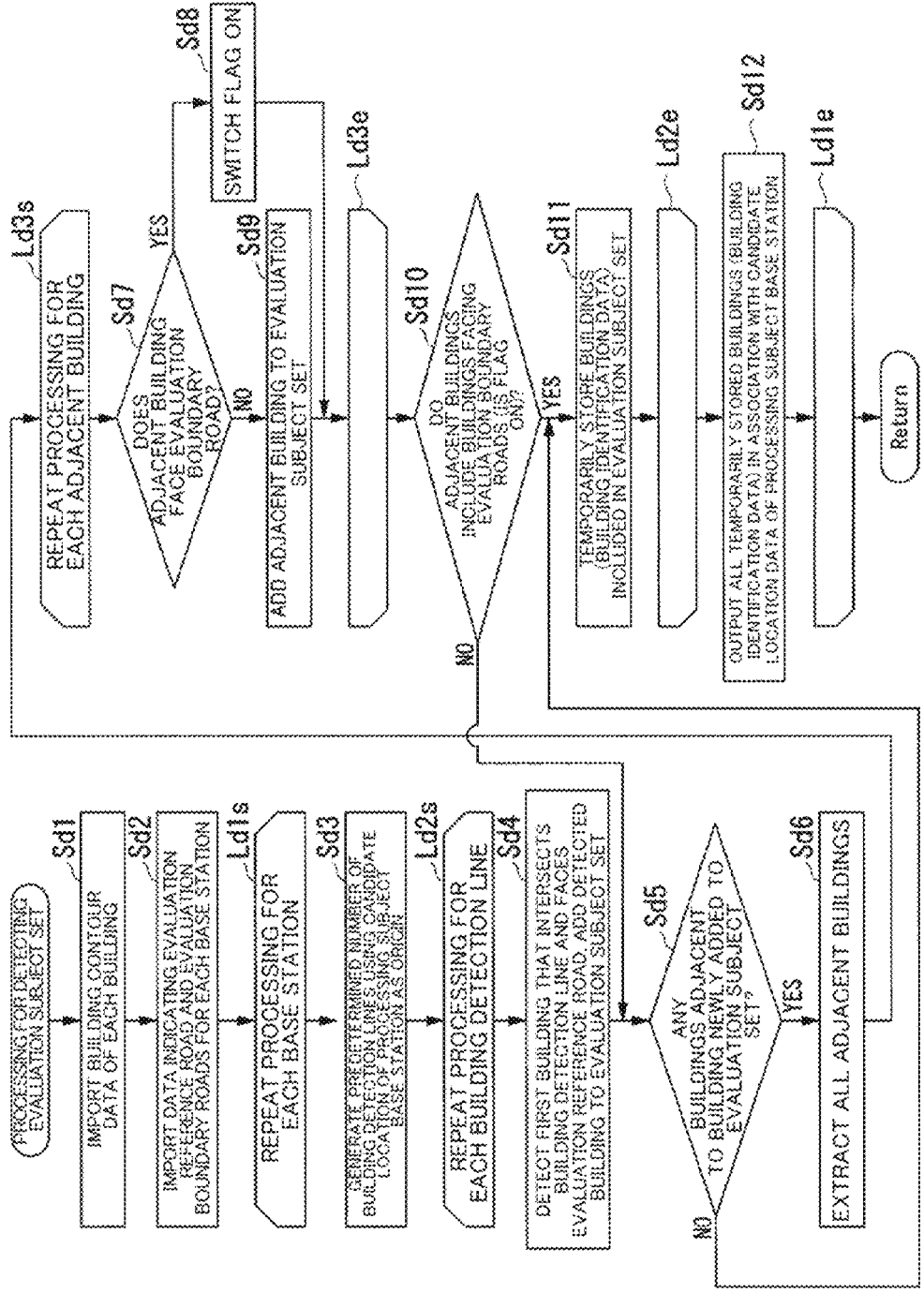
FIG. 24 is a flowchart showing a flow of processing performed by a vertical direction visibility detection processing unit according to the fourth embodiment.

FIG. 24 is a flowchart showing a flow of processing performed by the evaluation subject detection unit 23c according to the fourth embodiment to detect the evaluation subject set.

The processing performed by the evaluation subject detection unit 23c in accordance with the flowchart of FIG. 24 will be described below with reference to FIGS. 25 to 29. The evaluation subject detection unit 23c imports the building identification data output by the terminal station candidate location extraction unit 13-1 and the building contour data associated with the building identification data (step Sd1).

The evaluation subject detection unit 23c imports the road range data of the evaluation reference road and the road range data of the evaluation boundary roads for each set of base station candidate location data, output by the road classification processing unit 22 (step Sd2).

The evaluation subject detection unit 23c selects one set of base station candidate location data from among the imported base station candidate location data (loop Ld1s). Here, it is assumed that the evaluation subject detection unit 23c selects the base station candidate location data corresponding to the utility pole 40.

The evaluation subject detection unit 23c generates building detection lines originating from the location indicated by the base station candidate location data (step Sd3). Here, as shown in FIG. 25, it is assumed that the evaluation subject detection unit 23c generates the four building detection lines 150, 151, 152, 153, for example.

The evaluation subject detection unit 23c selects one building detection line 150, 151, . . . from the generated building detection lines 150, 151, . . . (loop Ld2s). Here, it is assumed that the evaluation subject detection unit 23c selects the building detection line 150.

The evaluation subject detection unit 23c initializes the evaluation subject set so as to create an empty set. The evaluation subject detection unit 23c detects the first building that intersects the selected building detection line 150 and faces the evaluation reference road corresponding to the base station candidate location data on the basis of the road range data of the evaluation reference road corresponding to the selected base station candidate location data and the building contour data, and adds the detected building to the evaluation subject set (step Sd4).

Figure 26:
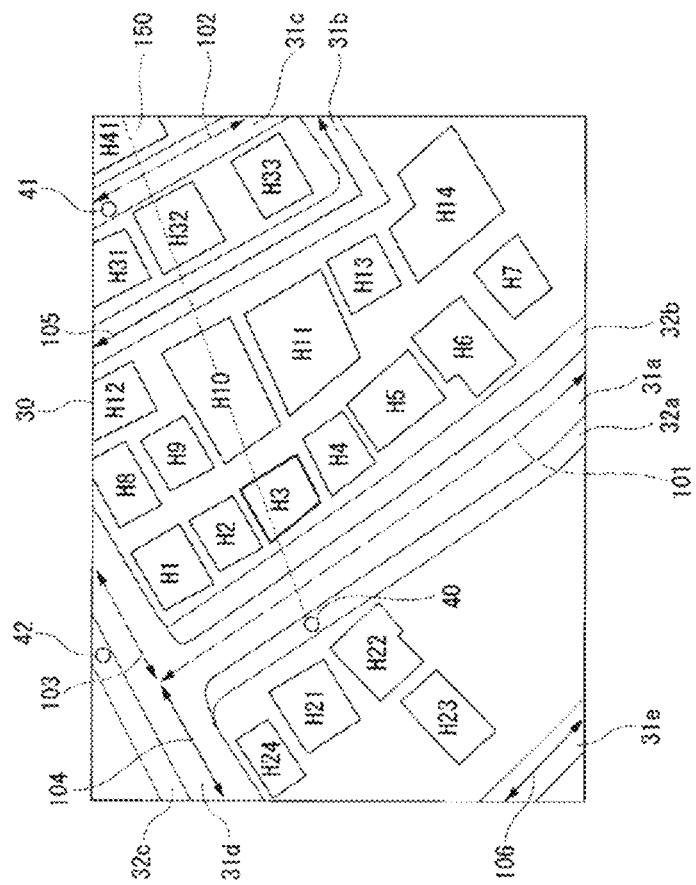
FIG. 26 is a view showing an outline (2) of the processing performed by the vertical direction visibility detection processing unit according to the fourth embodiment.

As shown in FIG. 26, the first building that intersects the building detection line 150 and faces the evaluation reference road corresponding to the base station candidate location data corresponding to the utility pole 40, or in other words the road indicated by the road range data 101, is the building H3. Hence, in step Sd4, the evaluation subject detection unit 23c detects the building H3 and adds the building identification data of the building H3 to the evaluation subject set.

The evaluation subject detection unit 23c then determines whether or not any buildings exist adjacent to the building newly added to the evaluation subject set on the basis of the building contour data corresponding to the building identification data (step Sd5). After determining that no buildings exist adjacent to the building newly added to the evaluation subject set (step Sd5, No), the evaluation subject detection unit 23c advances the processing to step Sd11.

After determining that a building exists adjacent to the building newly added to the evaluation subject set (step Sd5, Yes), on the other hand, the evaluation subject detection unit 23c extracts all of the buildings that are adjacent to the building newly added to the evaluation subject set and generates a set of the building identification data of the extracted buildings as the addition candidate set (step Sd6). In the example shown in FIG. 26, the building identification data of the building H3 is included in the evaluation subject set in step Sd4. Since buildings exist adjacent to the building H3, the evaluation subject detection unit 23c determines Yes in step Sd5.

Figure 27:
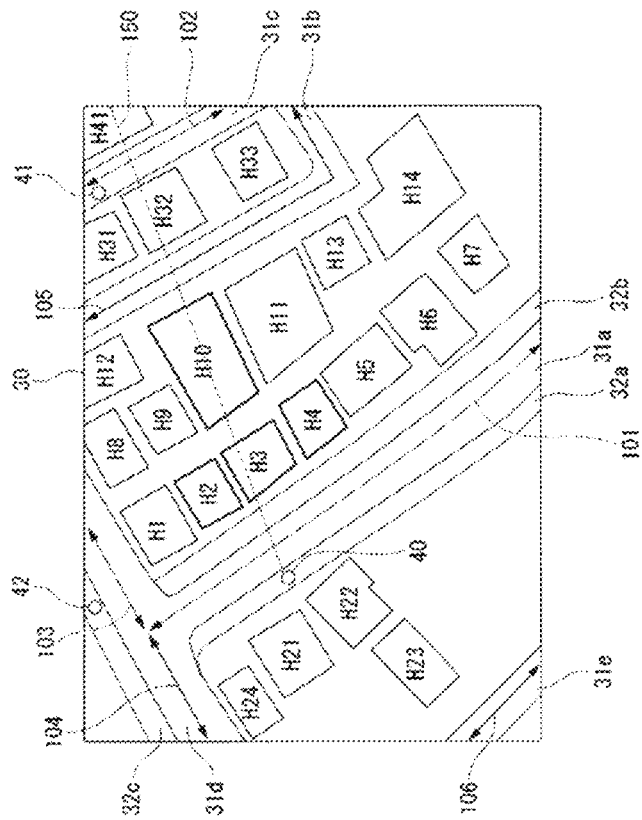
FIG. 27 is a view showing an outline (3) of the processing performed by the vertical direction visibility detection processing unit according to the fourth embodiment.

The buildings H2, H4, and H10, which are newly indicated by thick lines in FIG. 27, are the buildings adjacent to the building H3. Accordingly, in step Sd6, the evaluation subject detection unit 23c generates an addition candidate set including the building identification data of the buildings H2, H4, and H10.

The evaluation subject detection unit 23c selects one set of building identification data from among the building identification data included in the generated addition candidate set (loop Ld3s). Note that when the evaluation subject detection unit 23c selects the first set of building identification data from the generated addition candidate set, the evaluation subject detection unit 23c generates a flag region in an internal storage area and initializes the generated flag by writing "OFF" thereto.

The evaluation subject detection unit 23c determines whether or not the building corresponding to the selected building identification data faces an evaluation boundary road on the basis of the road range data of the evaluation boundary roads and the building contour data corresponding to the selected building identification data (step Sd7).

Having determined that the building corresponding to the selected building identification data faces an evaluation boundary road (step Sd7, Yes), the evaluation subject detection unit 23c writes "ON" to the flag (step Sd8). Having determined that the building corresponding to the selected building identification data does not face an evaluation boundary road (step Sd7, No), on the other hand, the evaluation subject detection unit 23c adds the selected building identification data to the evaluation subject set (step Sd9).

Following the processing of step Sd8 and step Sd9, the evaluation subject detection unit 23c selects a set of building identification data for which the processing of step Sd7 has not yet been performed from among the building identification data included in the generated addition candidate set and performs the processing of step Sd7 onward thereon (loop Ld3e).

In the example shown in FIG. 27, the addition candidate set generated by the evaluation subject detection unit 23c in step Sd6 includes the building identification data of the buildings H2, H4, and H10. The buildings H2, H4, and H10 do not face the evaluation boundary roads corresponding to the road range data 102 and 103. Accordingly, when any one of the buildings H2, H4, and H10 is selected, the evaluation subject detection unit 23c determines No in step Sd7 and adds the building identification data of the buildings H2, H4, and H10 to the evaluation subject set in step Sd9.

When the evaluation subject detection unit 23c has performed the processing of step Sd7 onward on all of the building identification data included in the generated addition candidate set, the evaluation subject detection unit 23c determines whether or not any buildings facing the evaluation boundary roads exist among the buildings corresponding to the building identification data included in the generated addition candidate set. In other words, the evaluation subject detection unit 23c determines whether or not the flag is "ON" (step Sd10).

Having determined that the flag is not "ON", or in other words that no buildings facing the evaluation boundary roads exist among the buildings corresponding to the building identification data included in the generated addition candidate set (step Sd10, No), the evaluation subject detection unit 23c performs the processing of step Sd5 onward on the buildings newly added to the evaluation subject set.

Having determined, on the other hand, that the flag is "ON", or in other words that a building facing an evaluation boundary road exists among the buildings corresponding to the building identification data included in the generated addition candidate set (step Sd10, Yes), the evaluation subject detection unit 23c writes the building identification data included in the evaluation subject set at that time to an internal storage area so that the data are temporarily stored therein (step Sd1l).

In the example shown in FIG. 27, when the buildings included in the addition candidate set are the buildings H2, H4, and H10, the evaluation subject detection unit 23c determines No in step Sd7 and therefore does not write "ON" to the flag in step Sd8. Accordingly, the evaluation subject detection unit 23c determines No in step Sd10 and then advances the processing to step Sd5.

Figure 28:
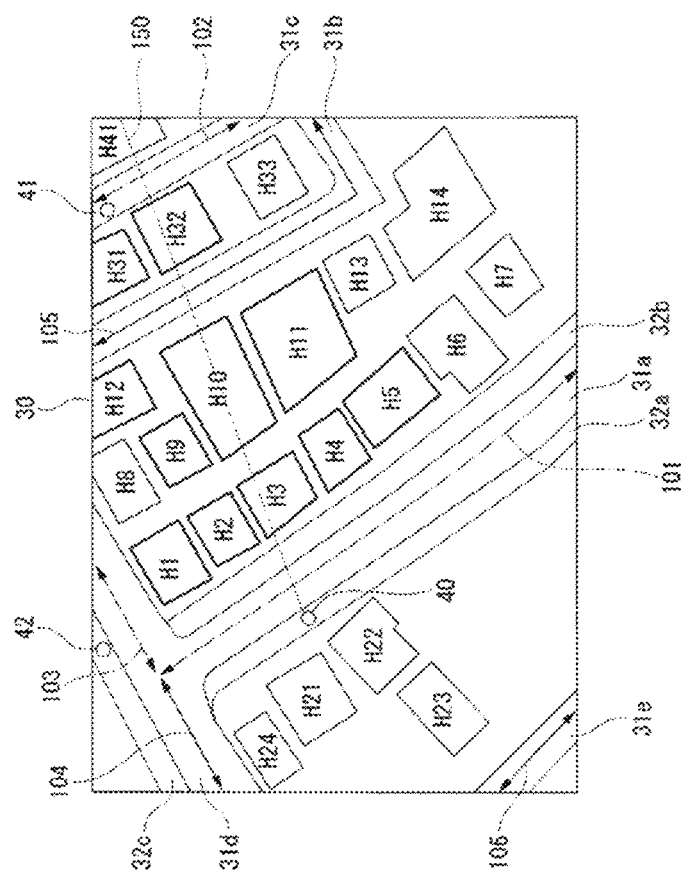
FIG. 28 is a view showing an outline (4) of the processing performed by the vertical direction visibility detection processing unit according to the fourth embodiment.

When the processing of step Sd5 is performed for the second time, the building identification data of the buildings H2, H3, H4, and H10 are included in the evaluation subject set. As shown in FIG. 28, buildings exist adjacent to the buildings H2, H4, and H10 newly added to the evaluation subject set. Accordingly, the evaluation subject detection unit 23c determines Yes in step Sd5.

When performing the processing of step Sd6 for the second time, the evaluation subject detection unit 23c extracts the buildings H1, H5, H9, H11, H12, H31, and H32, which are newly indicated by thick lines in FIG. 28, as the buildings adjacent to the buildings H2, H4, and H10. The evaluation subject detection unit 23c then generates an addition candidate set including the building identification data of the extracted buildings H1, H5, H9, H11, H12, H31, and H32.

In the processing of step Sd7 when implementing the loop Ld3s to Ld3e for the second time, the evaluation subject detection unit 23c determines that the building H1 faces the evaluation boundary road corresponding to the road range data 103. Further, the evaluation subject detection unit 23c determines that the buildings H31 and H32 face the evaluation boundary road corresponding to the road range data 102. Accordingly, the evaluation subject detection unit 23c writes "ON" to the flag in step Sd8.

Meanwhile, in the processing of step Sd7 when implementing the loop Ld3s to Ld3e for the second time, the evaluation subject detection unit 23c determines that the buildings H5, H9, H11, and H12 do not face the evaluation boundary roads. Accordingly, the evaluation subject detection unit 23c adds the building identification data of the buildings H5, H9, H11, and H12 to the evaluation subject set in step Sd9.

Figure 29:
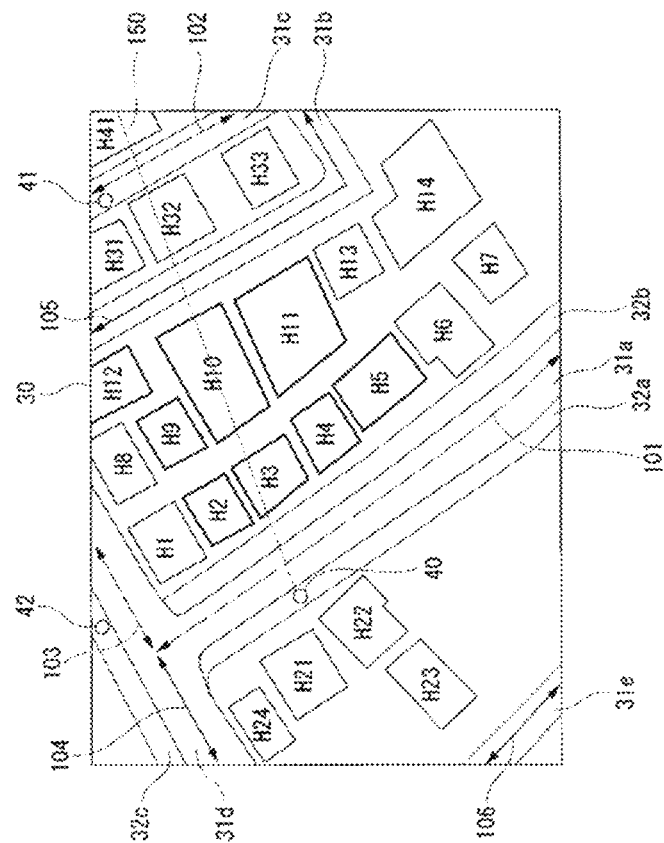
FIG. 29 is a view showing an outline (5) of the processing performed by the vertical direction visibility detection processing unit according to the fourth embodiment.

When performing the processing of step Sd10 for the second time, the evaluation subject detection unit 23c determines that the flag is "ON". At this point, as shown in FIG. 29, the evaluation subject set includes the building identification data of the buildings H2 to H5 and the buildings H9 to H12. In step Sd11, the evaluation subject detection unit 23c writes the building identification data of the buildings H2 to H5 and the buildings H9 to H12 included in the evaluation subject set to the internal storage area so that the data are temporarily stored therein.

The evaluation subject detection unit 23c then selects a building detection line on which the processing of step Sd4 onward has not yet been performed from among the building detection lines and performs the processing of step Sd4 onward thereon (loop Ld2e).

When the evaluation subject detection unit 23c has performed the processing of step Sd4 onward on all of the building detection lines corresponding to the processing subject base station candidate location data, the evaluation subject detection unit 23c reads all of the building identification data temporarily stored in the internal storage area. The evaluation subject detection unit 23c then associates the processing subject base station candidate location data with the read building identification data and outputs the resulting data to the vertical direction visibility detection subject building selection unit 20a (step Sd12).

The evaluation subject detection unit 23c then selects a set of base station candidate location data for which the processing of step Sd3 onward has not yet been performed from the base station candidate location data and performs the processing of step Sd3 onward thereon (loop Ld1e).

In the configuration of the fourth embodiment, described above, the road classification processing unit 22 divides the roads included in the two-dimensional map data by intersections and classifies the divided roads as either the evaluation reference road that serves as the reference for determining the visibility evaluation subject range or the evaluation boundary roads for determining the boundaries of the visibility evaluation subject range in relation to each set of base station candidate location data. The evaluation subject detection unit 23c then generates building detection lines extending in directions determined as desired for each set of base station candidate location data using the location indicated by the base station candidate location data as the origin. Then, for each building detection line, the evaluation subject detection unit 23c detects the first building that intersects the building detection line and faces the evaluation reference road corresponding to the base station candidate location data, and adds the detected building to the evaluation subject set. Then, every time the evaluation subject detection unit 23c adds a new building to the evaluation subject set, the evaluation subject detection unit 23c generates an addition candidate set, which is a set of the buildings that are adjacent to the added building. The evaluation subject detection unit 23c adds all of the buildings not facing the evaluation boundary roads corresponding to the base station candidate location data, among the buildings included in the generated addition candidate set, to the evaluation subject set repeatedly until one of the buildings included in the generated addition candidate set faces an evaluation boundary road corresponding to the base station candidate location data.

Thus, in the configuration of the fourth embodiment, the evaluation subject detection unit 23c can narrow down the range of buildings that serve as evaluation subjects for vertical direction visibility detection on the basis of the building detection lines and the evaluation boundary roads before the vertical direction visibility detection subject building selection unit 20a selects a vertical direction visibility detection subject building. In contrast to the configurations of the second and third embodiments, the evaluation subject detection unit 23c according to the fourth embodiment uses the building detection lines and can therefore determine the ranges of the evaluation subject buildings, among the buildings facing the evaluation reference road, using one building having horizontal direction visibility at a time as a reference. Hence, by applying the configuration of the fourth embodiment, the range of the buildings serving as the visibility detection evaluation subjects can be determined more accurately than with the configurations of the second and third embodiments.

Likewise with the configuration of the fourth embodiment, similarly to the second and third embodiments, there is no need for the vertical direction visibility detection subject building selection unit 20a to set all of the buildings included in the design area as subjects, as in the first embodiment. Accordingly, the number of buildings used by the vertical direction visibility detection processing unit 21 as processing subjects can also be narrowed down. As a result, the calculation amount of the processing for detecting the vertical direction visibility range can be reduced.

Fifth Embodiment

Figure 30:
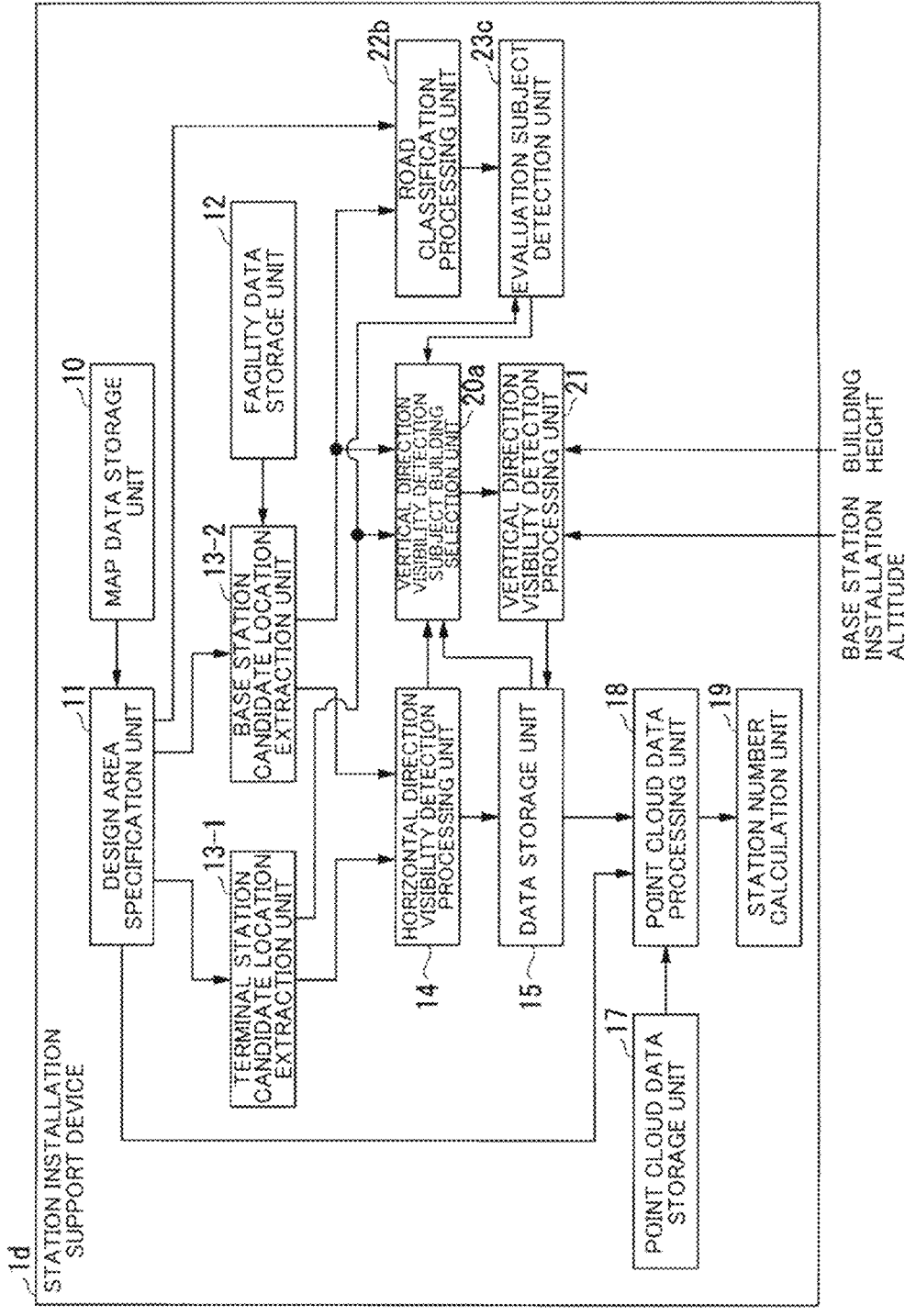
FIG. 30 is a block diagram showing a configuration of a station installation support device according to a fifth embodiment.

FIG. 30 is a block diagram showing a configuration of a station installation support device 1d according to a fifth embodiment. In the fifth embodiment, identical configurations to the first to fourth embodiments have been allocated identical reference symbols, and only different configurations will be described below.

The station installation support device 1d includes the map data storage unit 10, the design area specification unit 11, the equipment data storage unit 12, the terminal station candidate location extraction unit 13-1, the base station candidate location extraction unit 13-2, the horizontal direction visibility detection processing unit 14, the data storage unit 15, the point cloud data storage unit 17, the point cloud data processing unit 18, the station number calculation unit 19, the vertical direction visibility detection subject building selection unit 20a, the vertical direction visibility detection processing unit 21, the road classification processing unit 22b, and the evaluation subject detection unit 23c.

(Processing Performed by Station Installation Support Device According to Fifth Embodiment)

The difference between the processing of the fourth embodiment and the processing of the fifth embodiment is the processing performed by the road classification processing unit 22b in step S4-4-1 of the flowchart shown in FIG. 13. The processing performed by the road classification processing unit 22b in step S4-4-1 is identical to the processing performed by the road classification processing unit 22b in the third embodiment, described above. In the remaining steps S4-4-2, S4-4-3, and S4-4-4, identical processing to that of the fourth embodiment is performed. Accordingly, the evaluation subject detection unit 23c of the station installation support device 1d performs processing in accordance with the flow shown on the flowchart of FIG. 24, similarly to the fourth embodiment.

Figure 31:
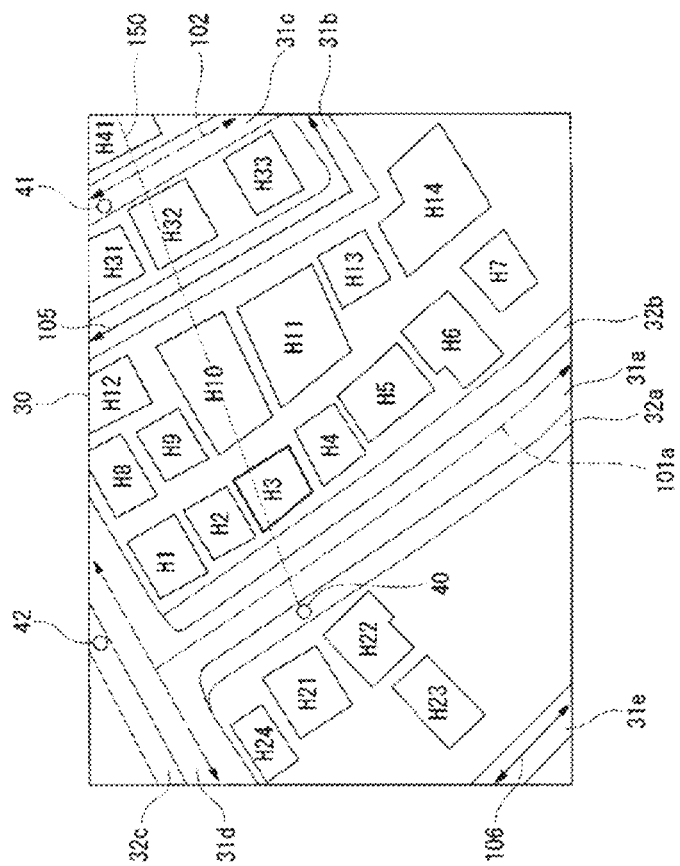
FIG. 31 is a view showing an outline (1) of processing performed by a vertical direction visibility detection processing unit according to the fifth embodiment.
Figure 32:
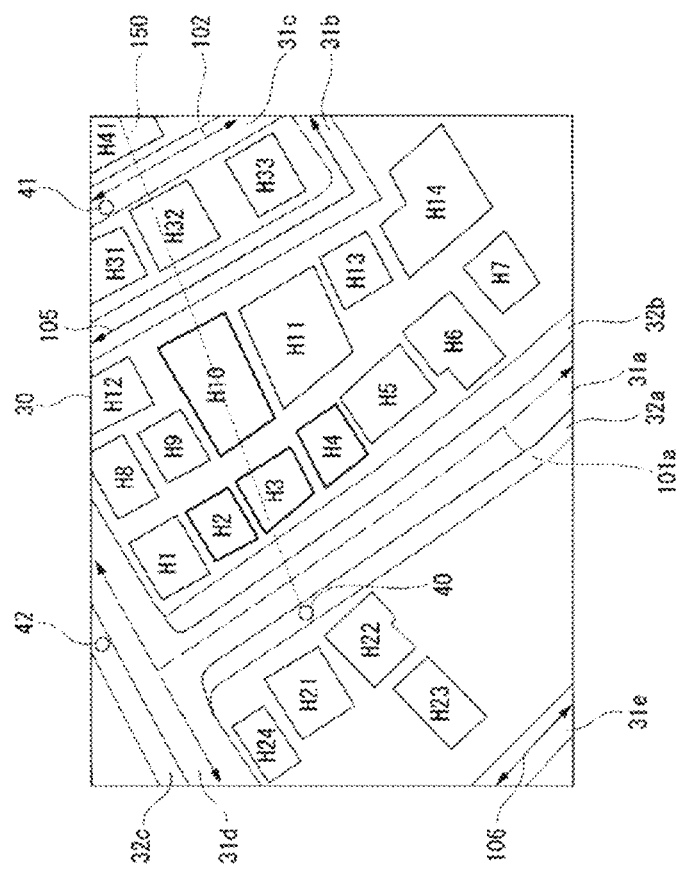
FIG. 32 is a view showing an outline (2) of the processing performed by the vertical direction visibility detection processing unit according to the fifth embodiment.
Figure 33:
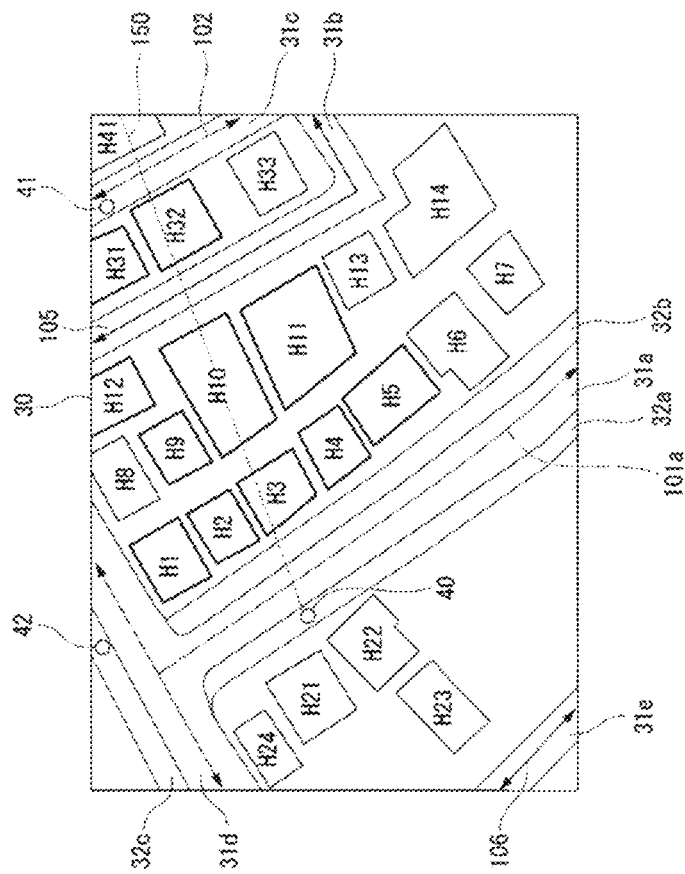
FIG. 33 is a view showing an outline (3) of the processing performed by the vertical direction visibility detection processing unit according to the fifth embodiment.

As shown in FIGS. 31 to 33, when performing step Sd6 for the second time, the evaluation subject detection unit 23c performs similar processing to the fourth embodiment up to the processing for generating the addition candidate set including the building identification data of the buildings adjacent to the buildings H2, H4, and H10. Hence, in FIGS. 31 and 32, the buildings included in the evaluation subject set are identical to those of FIGS. 26 and 27, respectively.

As shown in FIG. 33, by performing the processing of step Sd6 for the second time, the evaluation subject detection unit 23c extracts the buildings H1, H5, H9, H11, H12, H31, and H32 as the buildings adjacent to the buildings H2, H4, and H10. The evaluation subject detection unit 23c then generates an addition candidate set including the building identification data of the extracted buildings H1, H5, H9, H11, H12, H31, and H32.

In the fifth embodiment, the road 31a and the road 31d are continuous, and therefore the road classification processing unit 22b detects these roads as a single road. In contrast to the fourth embodiment, therefore, the evaluation subject detection unit 23c determines, in the processing of step Sd7 when implementing the loop Ld3s to Ld3e for the second time, that the building H1 does not face the evaluation boundary road.

Hence, in the processing of step Sd7 when implementing the loop Ld3s to Ld3e for the second time, the evaluation subject detection unit 23c determines No in relation to the buildings H1, H5, H9, H11, and H12 included in the addition candidate set and in step Sd9 adds the building identification data of the buildings H1, H5, H9, H11, and H12 to the evaluation subject set.

The buildings H31 and H32 included in the addition candidate set face the evaluation boundary road corresponding to the road range data 102, and therefore, in the processing of step Sd7 when implementing the loop Ld3s to Ld3e for the second time, the evaluation subject detection unit 23c determines Yes in relation to these buildings and writes "ON" to the flag in step Sd8.

Figure 34:
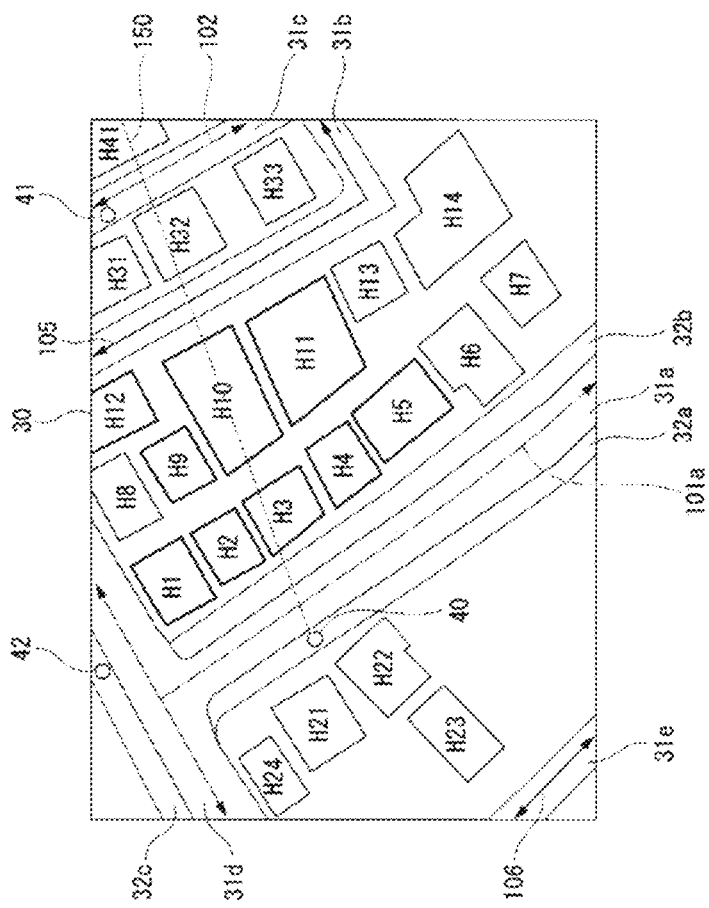
FIG. 34 is a view showing an outline (4) of the processing performed by the vertical direction visibility detection processing unit according to the fifth embodiment.
Figure 35:
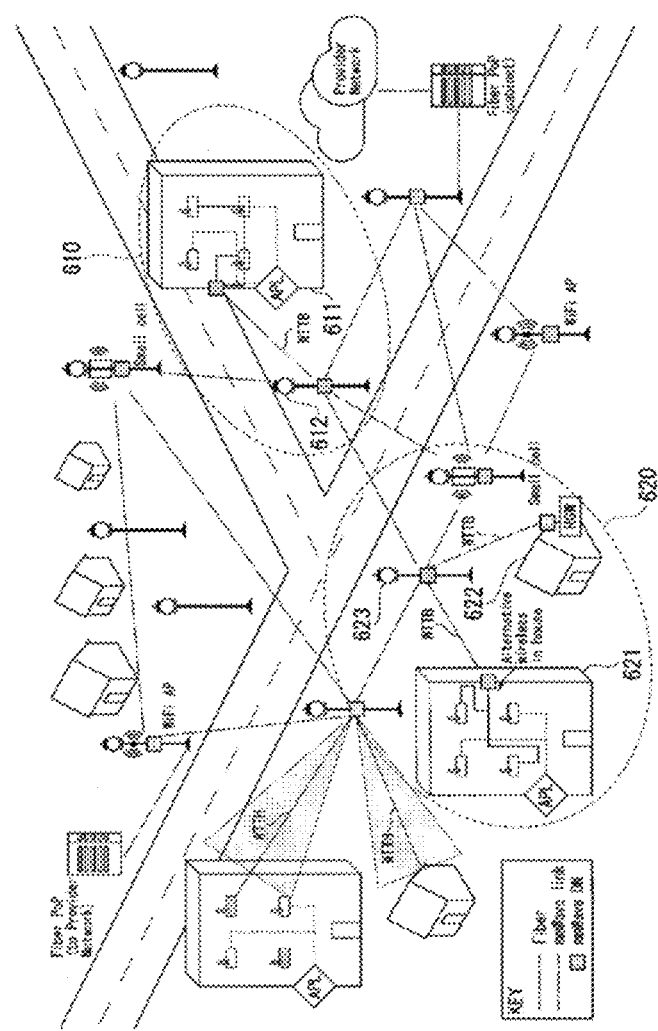
FIG. 35 is a view showing an example of a use case proposed by the TIP.

Since the flag is "ON", the evaluation subject detection unit 23c determines Yes in step Sd10. At this time, as shown in FIG. 34, the buildings included in the evaluation subject set are the buildings H1 to H5 and the buildings H9 to H12, and therefore, in step Sd11, the evaluation subject detection unit 23c writes the building identification data of the buildings H1 to H5 and the buildings H9 to H12 to the internal storage area so that the data are temporarily stored therein.

In the configuration of the fifth embodiment, described above, the road classification processing unit 22b regards continuous roads, among the roads included in the two-dimensional map data, as a single road and classifies the roads as either the evaluation reference road that serves as the reference for determining the visibility evaluation subject range or the evaluation boundary road for determining the boundary of the visibility evaluation subject range in relation to each set of base station candidate location data. The evaluation subject detection unit 23c then generates building detection lines extending in directions determined as desired for each set of base station candidate location data using the location indicated by the base station candidate location data as the origin. Then, for each building detection line, the evaluation subject detection unit 23c detects the first building that intersects the building detection line and faces the evaluation reference road corresponding to the base station candidate location data, and adds the detected building to the evaluation subject set. Then, every time the evaluation subject detection unit 23c adds a new building to the evaluation subject set, the evaluation subject detection unit 23c generates an addition candidate set, which is a set of the buildings that are adjacent to the added building. The evaluation subject detection unit 23c adds all of the buildings not facing the evaluation boundary road corresponding to the base station candidate location data, among the buildings included in the generated addition candidate set, to the evaluation subject set repeatedly until one of the buildings included in the generated addition candidate set faces the evaluation boundary road corresponding to the base station candidate location data.

Thus, in the configuration of the fifth embodiment, the evaluation subject detection unit 23c can narrow down the range of buildings that serve as evaluation subjects for vertical direction visibility detection on the basis of the building detection lines and the evaluation boundary road before the vertical direction visibility detection subject building selection unit 20a selects a vertical direction visibility detection subject building. In contrast to the configurations of the second and third embodiments, the evaluation subject detection unit 23c according to the fifth embodiment uses the building detection lines and can therefore determine the range of the evaluation subject buildings, among the buildings facing the evaluation reference road, using one building having horizontal direction visibility at a time as a reference. Hence, by applying the configuration of the fifth embodiment, the range of the buildings that serve as visibility detection evaluation subjects can be determined more accurately than with the configurations of the second and third embodiments.

Likewise with the configuration of the fifth embodiment, similarly to the second to fourth embodiments, there is no need for the vertical direction visibility detection subject building selection unit 20a to set all of the buildings included in the design area as subjects, as in the first embodiment. Accordingly, the number of buildings used by the vertical direction visibility detection processing unit 21 as processing subjects can also be narrowed down. As a result, the calculation amount of the processing for detecting the vertical direction visibility range can be reduced.

Note that in the fourth and fifth embodiments, described above, the evaluation subject detection unit 23c detects the first building that intersects the building detection line and faces an evaluation reference road corresponding to the base station candidate location data for each building detection line, but the configuration of the present invention is not limited to this embodiment. The evaluation subject detection unit 23c may detect the first building that intersects the building detection line for each building detection line regardless of whether or not the building faces an evaluation reference road corresponding to the base station candidate location data.

In the second to fifth embodiments, described above, the buildings H31 to H33 are regarded as being adjacent to the buildings H10 to H13. However, since the road 31b is sandwiched therebetween, the fixed distance range condition may be changed so that the buildings H31 to H33 are not regarded as being adjacent to the buildings H10 to H13.

Further, in the second to fifth embodiments, the evaluation subject detection unit 23, 23c extracts the buildings that are adjacent to a certain building when generating the addition candidate set, but the configuration of the present invention is not limited to this embodiment, and buildings that are close to a certain building, for example peripheral buildings within a fixed distance range of the certain building, may be extracted instead of buildings that are adjacent to the certain building.

Furthermore, in the embodiments described above, during the processing of step Sb11 shown in FIG. 9, the determination processing is performed using "less than/greater than or equal to" signs. However, the configuration of the present invention is not limited to this embodiment, and since processing for determining "whether or not . . . equals or exceeds" is merely an example, this processing may be replaced by processing for determining "whether or not . . . exceeds" in accordance with the method for determining the allowable visibility range length.

The station installation support devices 1, 1a, 1b, 1c, and 1d of the embodiments described above may be realized by a computer. In this case, the station installation support devices 1, 1a, 1b, 1c, and 1d may be realized by recording a program for realizing the functions thereof on a computer-readable recording medium and causing a computer system to read and execute the program recorded on the recording medium. Note that here, the "computer system" is assumed to include an OS and hardware such as peripheral devices. Further, the "computer-readable recording medium" is a portable medium such as a flexible disk, a magneto-optical disk, a ROM, or a CD-ROM, or a storage device such as hardware built into the computer system. The "computer-readable recording medium" may also include a medium that holds the program dynamically for a short period, for example a communication line in a case where the program is transmitted over a network such as the Internet or a communication line such as a telephone line, or a medium that holds the program for a fixed period, for example a volatile memory in the interior of a computer system that serves as the server or the client in the aforesaid case. Furthermore, the program may be used to realize some of the functions described above and to realize the aforesaid functions in combination with a program that is already recorded in the computer system, and may also be realized using a programmable logic device such as an FPGA (Field Programmable Gate Array).

Embodiments of the present invention were described in detail above with reference to the figures, but the specific configurations are not limited to these embodiments and also include designs and so on within a scope that does not depart from the spirit of the invention.

INDUSTRIAL APPLICABILITY

The present invention can be used to specify candidate locations for installing base stations and terminal stations used for wireless communication.

REFERENCE SIGNS LIST

1 Station installation support device
10 Map data storage unit
11 Design area specification unit
12 Equipment data storage unit
13-1 Terminal station candidate location extraction unit
13-2 Base station candidate location extraction unit
14 Horizontal direction visibility detection processing unit
15 Data storage unit
17 Point cloud data storage unit
18 Point cloud data processing unit
19 Station number calculation unit
20 Vertical direction visibility detection subject building selection unit
21 Vertical direction visibility detection processing unit

The invention claimed is:

1. A station installation support method comprising:
a vertical direction visibility detection subject building selecting step for setting, on two-dimensional map data indicating buildings serving as candidates for installing terminal station devices, locations of base station installation structures serving as candidates for installing base station devices as base station candidate locations, and selecting, for each of the base station candidate locations, buildings that have other buildings between themselves and the base station candidate location as visibility detection subject buildings;
a vertical direction visibility detection processing step for setting the heights of the buildings at an identical length, setting a higher position than the buildings as an installation altitude of the base station devices, and detecting, for each of the visibility detection subject buildings selected in the vertical direction visibility detection subject building selecting step, a visibility range of the visibility detection subject building from the installation altitude of the base station device in the base station candidate location; and
a point cloud data processing step for narrowing down, on the basis of the detected visibility ranges, three-dimensional point cloud data acquired by photographing a region including the base station installation structures and the buildings, and using the narrowed-down point cloud data to determine the visibility of the buildings from the base station candidate locations.

2. The station installation support method according to claim 1, wherein the vertical direction visibility detection processing step includes:
a representative direction line generating step for generating, for each of the base station candidate locations, a representative direction line, which is a straight line that originates from the base station candidate location and is oriented in a direction that intersects a predetermined location on the visibility detection subject building;
a visibility detection subject wall surface detecting step for detecting a location that is closest to the base station candidate location, among locations where a contour of the visibility detection subject building and the representative direction line intersect, as a location of a visibility detection subject wall surface of the visibility detection subject building, and calculating a distance on a horizontal plane between the detected location of the visibility detection subject wall surface and the base station candidate location as a visibility detection subject wall surface distance;
a shielding wall surface detecting step for detecting building wall surfaces that intersect the representative direction line in order from the wall surface closest to the base station candidate location, detecting a location where the building wall surface detected immediately before the visibility detection subject wall surface intersects the representative direction line as the location of a shielding wall surface, and calculating a distance on a horizontal plane between the detected location of the shielding wall surface and the base station candidate location as a shielding wall surface distance; and
a visibility range detecting step for detecting a visibility range of the visibility detection subject wall surface in relation to each of the representative direction lines on the basis of the height of the buildings, the installation altitude of the base station device corresponding to the base station candidate location, the visibility detection subject wall surface distance, and the shielding wall surface distance.

3. The station installation support method according to claim 1, comprising:
a road classification processing step for classifying roads indicated on the two-dimensional map data as either an evaluation reference road that serves as a reference for determining a visibility evaluation subject range or an evaluation boundary road for determining a boundary of the visibility evaluation subject range in relation to each of the base station candidate locations; and
an evaluation subject detecting step for detecting, for each of the base station candidate locations, an evaluation subject set, which is a set of buildings included in the visibility evaluation subject range, on the basis of the evaluation reference road and the evaluation boundary road corresponding to the base station candidate location,
wherein, in the vertical direction visibility detection subject building selecting step, the buildings that have other buildings between themselves and the base station candidate location are selected from the buildings included in the evaluation subject set as the visibility detection subject buildings.

4. The station installation support method according to claim 3, wherein, in the evaluation subject detecting step, the buildings facing the evaluation reference road corresponding to the base station candidate location are detected for each of the base station candidate locations, the detected buildings are added to the evaluation subject set, every time a new building is added to the evaluation subject set, an addition candidate set, which is a set of the buildings existing near the added building, is generated, and all of the buildings not facing the evaluation boundary road corresponding to the base station candidate location, among the buildings included in the generated addition candidate set, are added to the evaluation subject set repeatedly until one of the buildings included in the generated addition candidate set faces the evaluation boundary road corresponding to the base station candidate location.

5. The station installation support method according to claim 3, wherein, in the evaluation subject detecting step, building detection lines that originate from the base station candidate location and extend in directions determined as desired are generated for each of the base station candidate locations, for each of the building detection lines, the first building that intersects the building detection line is detected and the detected building is added to an evaluation subject set, every time a new building is added to the evaluation subject set, an addition candidate set, which is a set of the buildings existing near the added building, is generated, and all of the buildings not facing the evaluation boundary road corresponding to the base station candidate location, among the buildings included in the generated addition candidate set, are added to the evaluation subject set repeatedly until one of the buildings included in the generated addition candidate set faces the evaluation boundary road corresponding to the base station candidate location.

6. The station installation support method according to claim 3, wherein, in the road classification processing step, for each of the base station candidate locations, a road to which the location indicated by the base station candidate location belongs is classified as the evaluation reference road, while a road to which a location indicated by a base station candidate location other than the base station candidate location corresponding to the evaluation reference road belongs is classified as the evaluation boundary road.

7. The station installation support method according to claim 3, wherein, in the road classification processing step, the roads included in the two-dimensional map data are divided by intersections, whereupon the divided roads are each classified as either the evaluation reference road or the evaluation boundary road, or a continuous road among the roads included in the two-dimensional map data is regarded as a single road, whereupon the roads are each classified as either the evaluation reference road or the evaluation boundary road.

8. A station installation support device comprising:
a vertical direction visibility detection subject building selection unit for setting, on two-dimensional map data indicating buildings serving as candidates for installing terminal station devices, locations of base station installation structures serving as candidates for installing base station devices as base station candidate locations, and selecting, for each of the base station candidate locations, buildings that have other buildings between themselves and the base station candidate location as visibility detection subject buildings;
a vertical direction visibility detection processing unit for setting the heights of the buildings at an identical length, setting a higher position than the buildings as an installation altitude of the base station devices, and detecting, for each of the visibility detection subject buildings selected by the vertical direction visibility detection subject building selecting unit, a visibility range of the visibility detection subject building from the installation altitude of the base station device in the base station candidate location; and
a point cloud data processing unit for narrowing down, on the basis of the detected visibility ranges, three-dimensional point cloud data acquired by photographing a region including the base station installation structures and the buildings, and using the narrowed-down point cloud data to determine the visibility of the buildings from the base station candidate locations.

\* \* \* \* \*